(12) United States Patent
Marty et al.

(10) Patent No.: US 9,309,976 B2
(45) Date of Patent: Apr. 12, 2016

(54) VALVE ASSEMBLY FOR A TWO HANDLE FAUCET

(71) Applicant: Masco Corporation of Indiana, Indianapolis, IN (US)

(72) Inventors: Garry Robin Marty, Fishers, IN (US); Kurt Judson Thomas, Indianapolis, IN (US)

(73) Assignee: Delta Faucet Company, Indianapolis, IN (US)

( * ) Notice: Subject to any disclaimer, the term of this patent is extended or adjusted under 35 U.S.C. 154(b) by 0 days.

(21) Appl. No.: 14/514,314

(22) Filed: Oct. 14, 2014

(65) Prior Publication Data

US 2015/0028241 A1    Jan. 29, 2015

Related U.S. Application Data

(62) Division of application No. 12/994,968, filed as application No. PCT/US2009/047973 on Jun. 19, 2009, now Pat. No. 8,881,755.

(60) Provisional application No. 61/132,664, filed on Jun. 20, 2008.

(51) Int. Cl.
*F16K 3/02* (2006.01)
*E03C 1/04* (2006.01)
*F16K 11/20* (2006.01)
(Continued)

(52) U.S. Cl.
CPC .................. *F16K 3/0227* (2013.01); *E03C 1/04* (2013.01); *E03C 1/0401* (2013.01); *F16K 3/04* (2013.01); *F16K 3/08* (2013.01); *F16K 3/10* (2013.01); *F16K 11/0743* (2013.01); *F16K 11/207* (2013.01); *F16K 19/006* (2013.01); *F16K 27/045* (2013.01); *Y10T 137/043* (2015.04); *Y10T 137/5196* (2015.04);
(Continued)

(58) Field of Classification Search
CPC ..... F16K 3/0227; F16K 3/10; F16K 11/0743; F16K 3/08; F16K 19/006; F16K 11/207; E03C 1/0401
USPC .............. 137/801, 606, 454.6, 315.13, 15.23, 137/270, 271; 251/208, 288, 314, 316, 251/317.01; 277/628
See application file for complete search history.

(56) References Cited

U.S. PATENT DOCUMENTS 1,953,448 A    4/1934    Thaete et al.
3,736,959 A    6/1973    Parkison
(Continued)

FOREIGN PATENT DOCUMENTS

DE    29 26 793    1/1981
EP    1072830 B1    9/2004
(Continued)

OTHER PUBLICATIONS

International Search Report and Written Opinion for PCT Application No. PCT/US2009/047973, issued Aug. 7, 2009, 13 pgs.

*Primary Examiner* — Atif Chaudry
(74) *Attorney, Agent, or Firm* — Faegre Baker Daniels LLP

(57) ABSTRACT

The present disclosure relates generally to a faucet valve cartridge 10 configured for use within a dual handle faucet 16, 18. The valve cartridge 10 includes first and second fluid flow control members 94 and 96 received within a valve housing 74 and configured to control fluid flow from an inlet 32, 36 to an outlet 29.

29 Claims, 24 Drawing Sheets

(51) Int. Cl.
*F16K 3/10* (2006.01)
*F16K 11/074* (2006.01)
*F16K 3/08* (2006.01)
*F16K 11/00* (2006.01)
*F16K 3/04* (2006.01)
*F16K 27/04* (2006.01)

(52) U.S. Cl.
CPC ..... *Y10T 137/5283* (2015.04); *Y10T 137/6017* (2015.04); *Y10T 137/7613* (2015.04); *Y10T 137/87684* (2015.04)

(56) References Cited

U.S. PATENT DOCUMENTS

| | | | |
|---|---|---|---|
| 3,788,601 A | 1/1974 | Schmitt |
| 3,810,602 A | 5/1974 | Parkinson |
| 3,831,621 A | 8/1974 | Anthony et al. |
| 3,834,416 A | 9/1974 | Parkison |
| 3,960,016 A | 6/1976 | Symmons |
| 4,005,728 A | 2/1977 | Thorp |
| 4,256,163 A | 3/1981 | Orszullok |
| 4,397,330 A | 8/1983 | Hayman |
| 4,423,752 A | 1/1984 | Psarouthakis |
| 4,425,935 A | 1/1984 | Gonzalez |
| 4,465,259 A | 8/1984 | Allen et al. |
| 4,604,202 A | 8/1986 | Movshovitz |
| 4,651,770 A | 3/1987 | Denham et al. |
| 4,754,783 A | 7/1988 | Knapp |
| 4,793,375 A | 12/1988 | Marty |
| 4,838,304 A | 6/1989 | Knapp |
| 4,971,112 A | 11/1990 | Knapp |
| 4,981,156 A | 1/1991 | Nicklas et al. |
| 5,094,258 A | 3/1992 | Orlandi |
| 5,150,737 A | 9/1992 | Clerc |
| 5,174,324 A | 12/1992 | Chrysler |
| 5,355,906 A | 10/1994 | Marty et al. |
| 5,398,717 A | 3/1995 | Goncze |
| 5,402,827 A | 4/1995 | Gonzalez |
| 5,692,536 A | 12/1997 | Tokarz |
| 5,725,010 A | 3/1998 | Marty et al. |
| 5,749,393 A | 5/1998 | Yang |
| 5,832,952 A | 11/1998 | Cook et al. |
| 5,931,374 A | 8/1999 | Knapp |
| 5,967,184 A | 10/1999 | Change |
| 6,123,105 A | 9/2000 | Yange |
| 6,135,152 A | 10/2000 | Knapp |
| 6,293,299 B1 | 9/2001 | Nelson |
| 6,517,006 B1 | 2/2003 | Knapp |
| 6,880,573 B2 | 4/2005 | Berkman et al. |
| 6,886,578 B1 | 5/2005 | Knapp |
| 6,959,729 B2 | 11/2005 | Graber |
| 7,124,776 B1 | 10/2006 | Hwang |
| 7,140,390 B2 | 11/2006 | Berkman et al. |
| 7,261,117 B2 | 8/2007 | Mork et al. |
| 7,461,669 B2 | 12/2008 | Jonte et al. |
| 7,726,337 B2 | 6/2010 | Lorch |
| 2003/0088913 A1 | 5/2003 | Underbrink et al. |
| 2006/0191580 A1 | 8/2006 | Sponheimer et al. |
| 2006/0226389 A1 | 10/2006 | Jonte |
| 2008/0023085 A1 | 1/2008 | Rosko et al. |
| 2009/0108223 A1 | 4/2009 | Deutsch et al. |
| 2009/0189108 A1 | 7/2009 | Ritter et al. |
| 2014/0060686 A1 | 3/2014 | Kemp et al. |

FOREIGN PATENT DOCUMENTS

| | | |
|---|---|---|
| JP | 59-190579 A | 10/1984 |
| JP | 60-121369 A | 6/1985 |
| WO | WO 86/07426 | 12/1986 |
| WO | WO 00/37837 | 6/2000 |
| WO | WO 2009/126887 | 10/2009 |
| WO | WO 2009/155529 | 12/2009 |
| WO | WO 2009/158497 | 12/2009 |
| WO | WO 2009/158498 | 12/2009 |

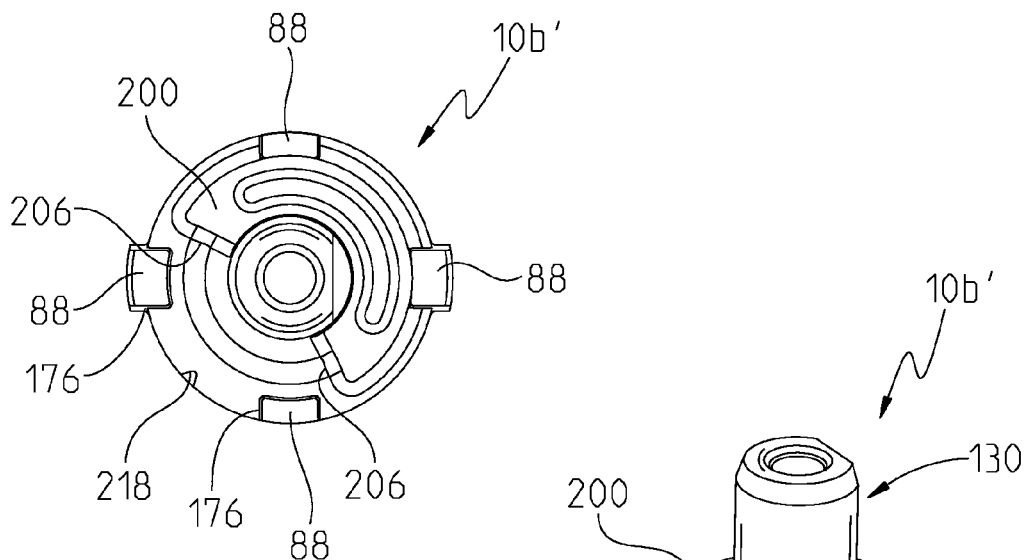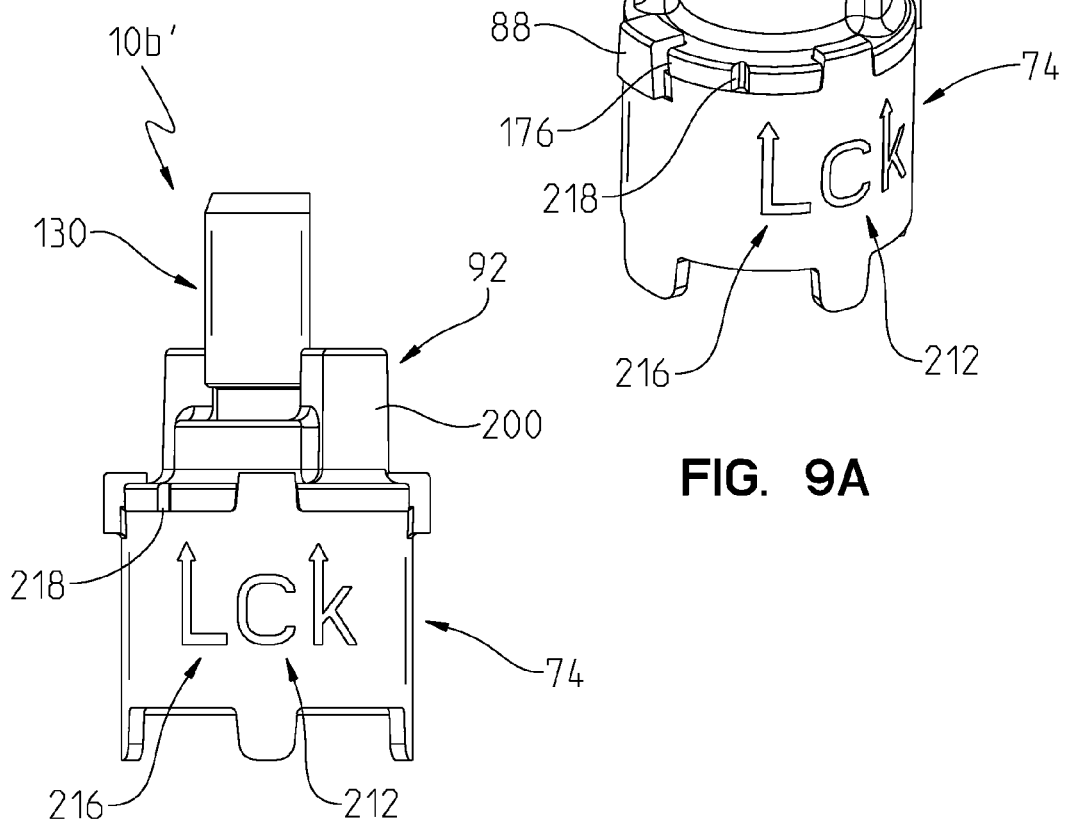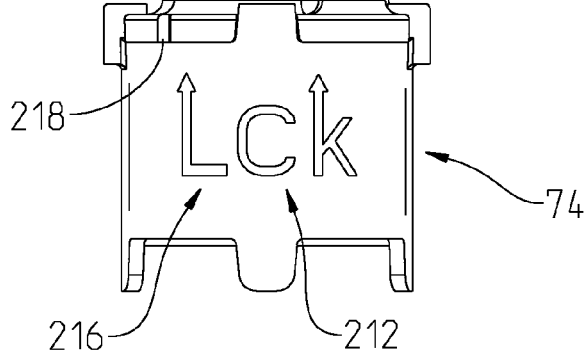
FIG. 9B
FIG. 9A
FIG. 9C

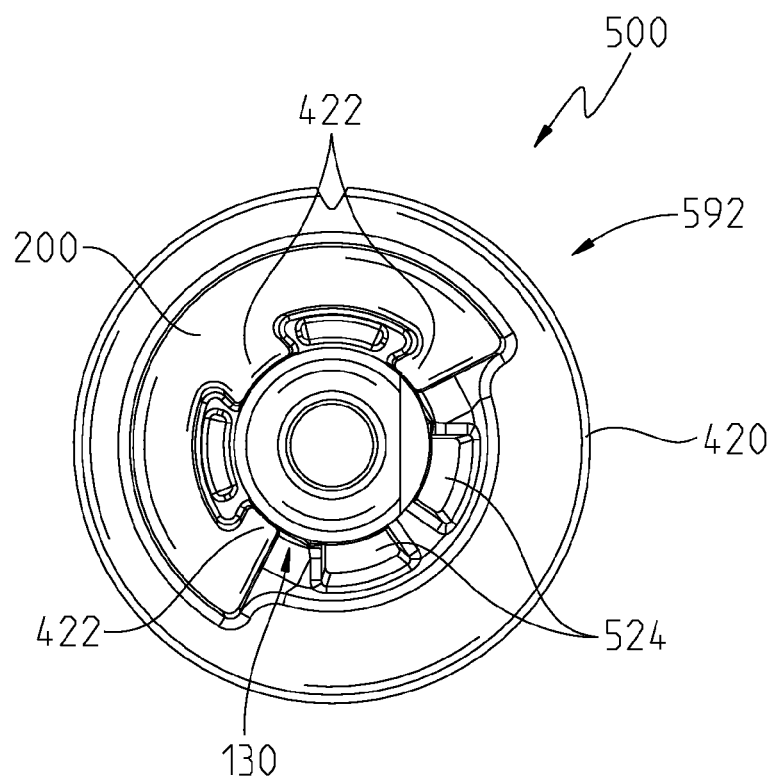
FIG. 30
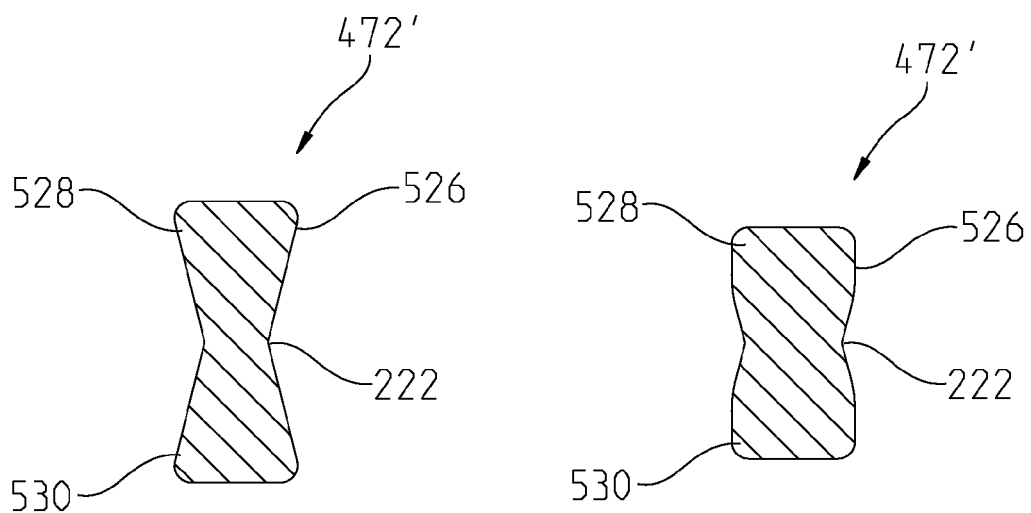
FIG. 31A
FIG. 31B

VALVE ASSEMBLY FOR A TWO HANDLE FAUCET

CROSS-REFERENCE TO RELATED APPLICATION

This application is a divisional of U.S. patent application Ser. No. 12/994,968, filed Nov. 29, 2010, which is a national phase filing of PCT International Application Serial No. PCT/US2009/047973, filed Jun. 19, 2009, which claims the benefit of U.S. Provisional Patent Application Ser. No. 61/132,664, filed Jun. 20, 2008, the disclosures of which are expressly incorporated herein by reference.

BACKGROUND AND SUMMARY OF THE INVENTION

The present disclosure relates generally to fluid control valves and, more particularly, to valve cartridges for use within a two handle faucet for controlling either hot water flow or cold water flow therethrough.

Faucets are typically controlled by either a single handle which utilizes a mixing valve to proportion the flow of hot and cold water to a faucet spout, or two handles which utilize individual valves to separately control the flow of hot water and cold water to the faucet spout. In the case of the standard prior art mixing valve, two inlets are provided, one each for the hot and cold water supplies. For two handle faucets, each valve typically includes a single inlet opening which fluidly communicates with the flow passageway of a valving member.

According to an illustrative embodiment of the present disclosure, a valve cartridge for a faucet includes a valve housing, and a first fluid flow member received within the valve housing and having a first sealing surface configured to rotate about a longitudinal axis. A second fluid flow member is received within the valve housing and is restrained from moving. The second fluid flow member includes a second sealing surface and at least one fluid opening extending into the second sealing surface, the first sealing surface of the first fluid flow member sealingly engaging the second sealing surface of the second fluid flow member to define a common interface including an outer portion having an inner boundary and an outer boundary, the inner boundary defined by the at least one fluid opening. A stem extends along the longitudinal axis and is operably coupled to the first fluid flow member and is configured to rotate the first fluid flow member about the longitudinal axis. At least one cleaning channel is formed within at least one of the inner and outer boundaries of the common interface. The at least one cleaning channel is configured to collect debris from between the first fluid flow member and the second fluid flow member and expel radially outwardly the debris from the common interface.

According to a further illustrative embodiment of the present disclosure, a valve cartridge for a faucet includes a valve housing defining a longitudinal axis, and a first fluid flow member received within the valve housing. The first fluid flow member includes a blind connecting recess and a first sealing surface extending around the connecting recess. The first fluid member is configured to rotate about the longitudinal axis. A second fluid flow member is received within the valve housing and restrained from moving. The second fluid flow member includes an inlet opening, an outlet opening, and a second sealing surface extending around the inlet opening and the outlet opening. The first sealing surface of the first fluid member sealingly engages the second sealing surface of the second fluid flow member. A stem extends along the longitudinal axis and is operably coupled to the first fluid flow member for rotating the first fluid flow member about the longitudinal axis to provide selective communication between the inlet opening and the outlet opening through the connecting recess. A cap includes a temperature limit stop and is supported for rotational adjustment relative to the valve housing. An engagement member is supported for rotation with the stem and is configured to selectively engage the limit stop to limit rotation of the stem and the first fluid flow member.

According to a another illustrative embodiment of the present disclosure, a valve cartridge for a faucet includes a valve housing, and a fluid flow control member supported within the valve housing and configured to control fluid flow from an inlet opening to an outlet opening. A stem is operably coupled to the fluid flow control member. A temperature limit stop is operably coupled to the valve housing for limited rotational adjustment. An indicator is supported for movement with the temperature limit stop. An engagement member is supported for movement with the stem and is configured to selectively engage the limit stop to limit movement of the stem and the fluid flow control member. Rotational adjustment of the limit stop relative to the valve housing to a first position provides a first rotational path to the fluid flow control member, and rotational adjustment of the limit stop relative to the valve housing to a second position provides a second rotational path to the fluid flow control member. The first rotational path is associated with a knob type arrangement such that movement of the fluid flow control member in a counterclockwise direction provides communication between the inlet and the outlet. The second rotational path is associated with a lever type arrangement such that movement of the fluid flow control member in a clockwise direction provides communication between the inlet and the outlet. The indicator is movable with the temperature limit stop to indicate one of the first rotational path associated with the knob type arrangement and the second rotational path associated with the lever type arrangement.

According to yet another illustrative embodiment of the present disclosure, a valve cartridge for a faucet includes a valve housing defining a longitudinal axis, and a first fluid flow member received within the valve housing and having a first sealing surface configured to rotate about the longitudinal axis. A second fluid flow member is received within the valve housing and is restrained from moving. The second fluid flow member includes a second sealing surface, the first sealing surface of the first fluid flow member sealingly engaging the second sealing surface of the second fluid flow member. The second fluid flow member further includes a first opening extending into the second sealing surface, and a second opening extending into the second sealing surface. A stem extends along the longitudinal axis and is operably coupled to the first fluid flow member for rotating the first fluid flow member about the longitudinal axis. A base supports the second fluid flow member and includes a first tubular member telescopingly received within the first opening of the second fluid flow member, and a second tubular member telescopingly received within the second opening of the second fluid flow member. A gasket is positioned intermediate the base and the second fluid flow member to provide a seal between the second fluid flow member and the base, and to provide a force for maintaining sealing engagement between the first sealing surface and the second sealing surface.

According to a further illustrative embodiment of the present disclosure, a valve cartridge for a faucet includes the valve housing, a fluid flow control member supported within the valve housing, and a stem operably coupled to the fluid flow control member. A cap is supported by the valve housing and includes a bore receiving the stem. A plurality of ribs extend inwardly toward the bore for contacting the stem. At least one finger is biased inwardly toward the bore for preloading the stem toward the ribs.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 9A is a perspective view of the valve cartridge of FIG. 3 in a cold water lever orientation;

FIG. 9B is a top plan view of the valve cartridge of FIG. 9A;

FIG. 9C is a side elevational view of the valve cartridge of FIG. 9A;

FIG. 30 is a top plan view of the valve cartridge of FIG. 26;

FIG. 31A is a cross-sectional view of a wall of the illustrative gasket of FIG. 28 in a relaxed state; and FIG. 31B is a cross-sectional view similar to FIG. 31A, showing the gasket in a compressed state.

DETAILED DESCRIPTION OF THE DRAWINGS

The embodiments of the invention described herein are not intended to be exhaustive or to limit the invention to precise forms disclosed. Rather, the embodiment selected for description have been chosen to enable one skilled in the art to practice the invention.

Figure 1:
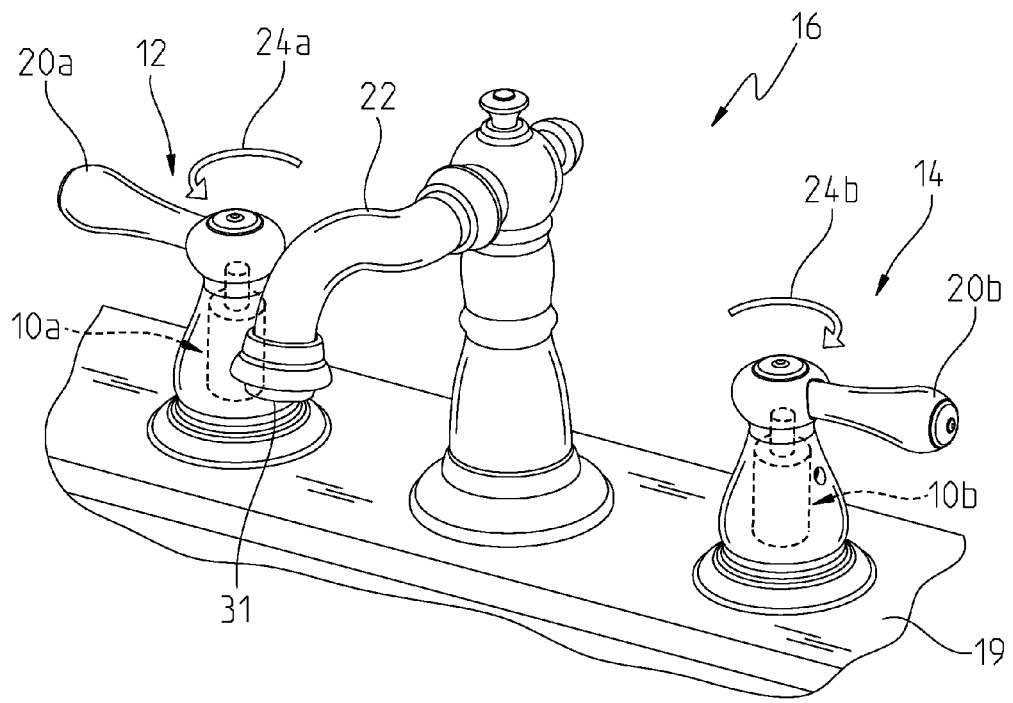
FIG. 1 is a perspective view of an illustrative lever type two handle faucet assembly wherein rotation of the levers toward a delivery spout activates water flow.
Figure 2:
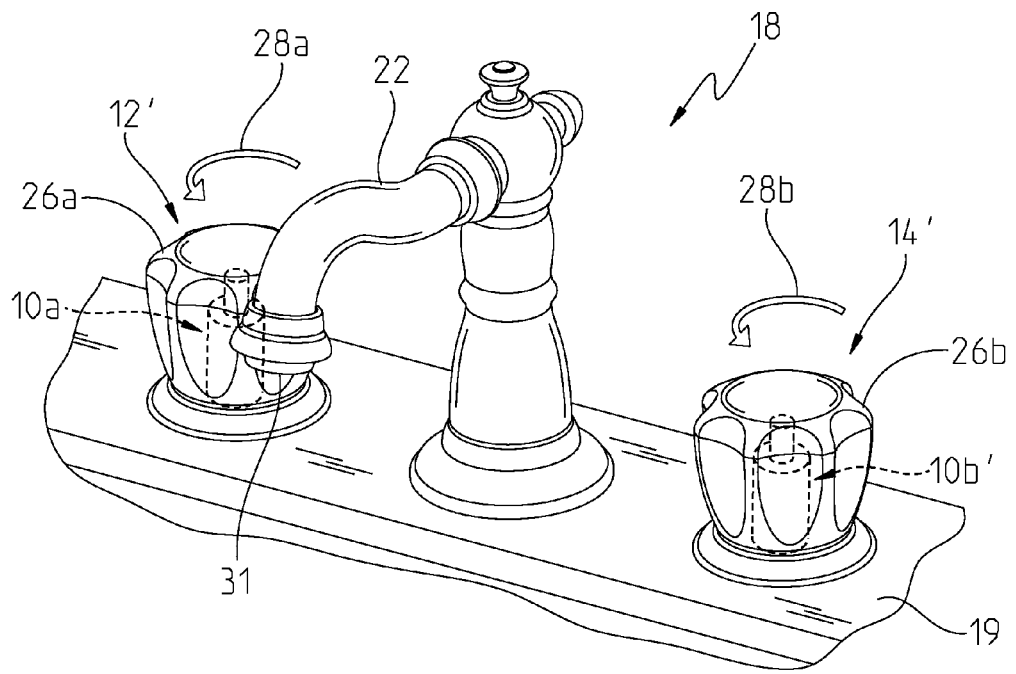
FIG. 2 is a perspective view of an illustrative knob type two handle faucet assembly wherein rotation of the operating knobs in a counterclockwise direction activates water flow.

With reference initially to FIGS. 1 and 2 of the drawings, the illustrative valve cartridge 10 of the present disclosure is configured to be used as a hot water control valve 12, 12' or a cold water control valve 14, 14'. For example, the valve cartridge 10 may be used within a lever type faucet 16 (FIG. 1) or a knob type faucet 18 (FIG. 2) supported by a sink or mounting deck 19. In a lever type faucet 16, rotation of a hot water lever or handle 20a in a counterclockwise direction, toward a delivery spout 22 as shown by arrow 24a, initiates the flow of hot water. In a similar manner, rotation of a cold water lever or handle 20b in a clockwise direction, toward a delivery spout 22 as shown by arrow 24b, initiates the flow of cold water. In the knob type faucet 18, water flow is initiated by rotating either the hot water knob 26a and the cold water knob 26b counterclockwise in the direction of arrows 28a and 28b, respectively. As further explained herein, all four user inputs 20a, 20b, 26a, and 26b may be operated with the valve cartridge 10 of the present disclosure. More particularly, rotation and/or simple modification to the valve cartridge 10 permits universal use thereof with any of a hot water lever 20a, a cold water lever 20b, a hot water knob 26a, and a cold water knob 26b.

Figure 3:
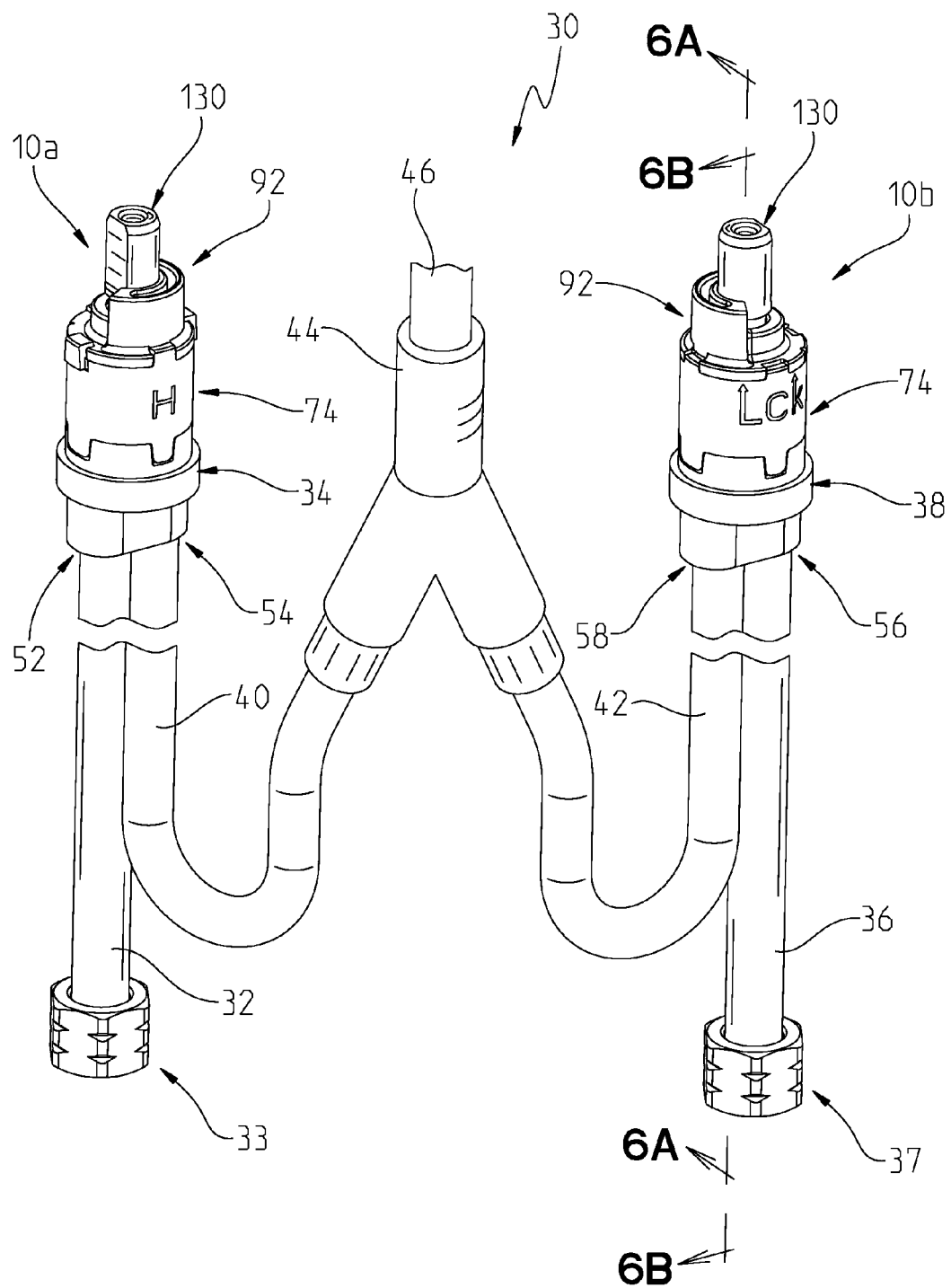
FIG. 3 is a perspective view of illustrative hot and cold water valve cartridges of the present disclosure fluidly coupled to respective hot and cold waterway assemblies.

With reference to FIG. 3, an illustrative waterway assembly 30 for use with a pair of valve cartridges 10a and 10b is shown. While the illustrative waterway assembly 30 of FIG. 3 is configured for use with the widespread faucets 16 and 18 (with control valves 12, 12', and 14, 14' and spout 22 separately mounted on the sink deck 19) shown in FIGS. 1 and 2, respectively, it should be appreciated that the valve cartridges 10 may find equal use with other waterway assemblies, including those configured for use with centerset faucets (with control valves and handles connected by a base). For example, the valve cartridge 10 may be utilized with the waterway assembly disclosed in PCT International application No. PCT/US09/40207, filed Apr. 10, 2009, entitled "Molded Waterway for a Two Handle Faucet."

The waterway assembly 30 of FIG. 3 fluidly couples the valve cartridges 10*a* and 10*b* upstream to hot and cold water supplies (not shown) and downstream to a mixed water outlet 29 supported by the delivery spout 22. The waterway assembly 30 includes a hot water inlet conduit 32 fluidly coupled to a hot water base 34, and a cold water inlet conduit 36 fluidly coupled to a cold water base 38. In a similar manner, a hot water outlet conduit 40 is fluidly coupled to the hot water base 34, and a cold water outlet conduit 42 is fluidly coupled to the cold water base 38. End fittings 33 and 37 are coupled to distal ends of inlet conduits 32 and 36 to facilitate coupling to hot and cold water supplies, illustratively conventional stops. A connector 44 illustratively fluidly couples the outlet conduits 40 and 42 to a mixed water or delivery spout conduit 46. Illustratively, the valve cartridges 10 may be received within valve bodies (not shown) which are secured to the sink deck 19 (FIGS. 1 and 2).

In an illustrative embodiment, the hot water base 34 is formed of a flowable material, such as a polymer, which is overmolded around proximal ends 52 and 54 of the hot water inlet conduit 32 and the outlet conduit 40, respectively. Similarly, the cold water base 38 is overmolded around proximal ends 56 and 58 of the cold water inlet conduit 36 and the outlet conduit 42. Illustratively, the conduits 32, 36, 40 are flexible, and may be formed of a polymer, such as polyethylene. In one illustrative embodiment, the conduits 32, 36, 40 and the respective bases 34 and 38 maybe formed of a polyethylene which is subsequently cross-linked to form cross-linked polyethylene (PEX). However, it should be appreciated that other suitable materials may be substituted therefor.

The cold water base 38 is substantially identical to the hot water base 34, but oriented 180 degrees relative thereto within a horizontal plane. More particularly, while the cold water base 38 is further detailed in FIGS. 4-6B, the hot water base 34 includes similar features. The base 38 illustratively includes a valve cartridge interface 60 having a first wall 62 defining a first boss 63 extending upwardly around an inlet port 64, and a second wall 66 defining a second boss 67 extending around an outlet port 68. The walls 62 and 66 define a seat or trench 70 for receiving a gasket 72. As further detailed herein, the gasket 72 provides a seal between the valve cartridge 10 and the base 38. While the inlet conduits 32 and 36 are illustrated as each having a circular cross-section, it should be noted that the cross-sectional shape of the inlet conduits 32 and 36 may vary. For example, the cross-sections of inlet conduits 32 and 36 may be oval or D-shaped in order to facilitate material flow during the molding operation for defining an increased and/or substantially consistent thickness of walls 62 and 66.

With reference to FIGS. 4-6B, the valve cartridge 10 illustratively includes a valve housing 74 supported by the base 38. The valve housing 74 includes opposing first and second ends 73 and 75 centered along a longitudinal axis 77. More particularly, the illustrative valve housing 74 includes a cylindrical side wall 76 having a plurality of downwardly extending locating tabs 78 and 80 at the second end 75 to facilitate proper orientation of the housing 74 relative to the base 38. In the illustrative embodiment, a first pair of diametrically opposed locating tabs 78 are circumferentially oriented 90 degrees from a second pair of diametrically opposed locating tabs 80. Each locating tab 78 illustratively has a first width different from a second width of each second locating tab 80. Cooperating openings or recesses 82 and 84 extend radially inwardly within the outer surface of the base 38 and are configured to receive locating tabs 78 and 80, respectively, thereby facilitating proper orientation of the valve cartridge 10 relative to the base 38. The locating tabs 78 and 80, and cooperating recesses 82 and 84, are arranged circumferentially at 90 degree increments such that the valve cartridge 10 may be rotated 180 degrees between a cold water orientation and a hot water orientation (as represented by valve cartridges 10*b* and 10*a*, respectively, in FIG. 3). In certain illustrative embodiments, the locating tabs 78 and 80 and cooperating recesses 82 and 84 have ramped or angled side edges for centering misalignment between the valve cartridge 10 and the base 38.

Figure 4:
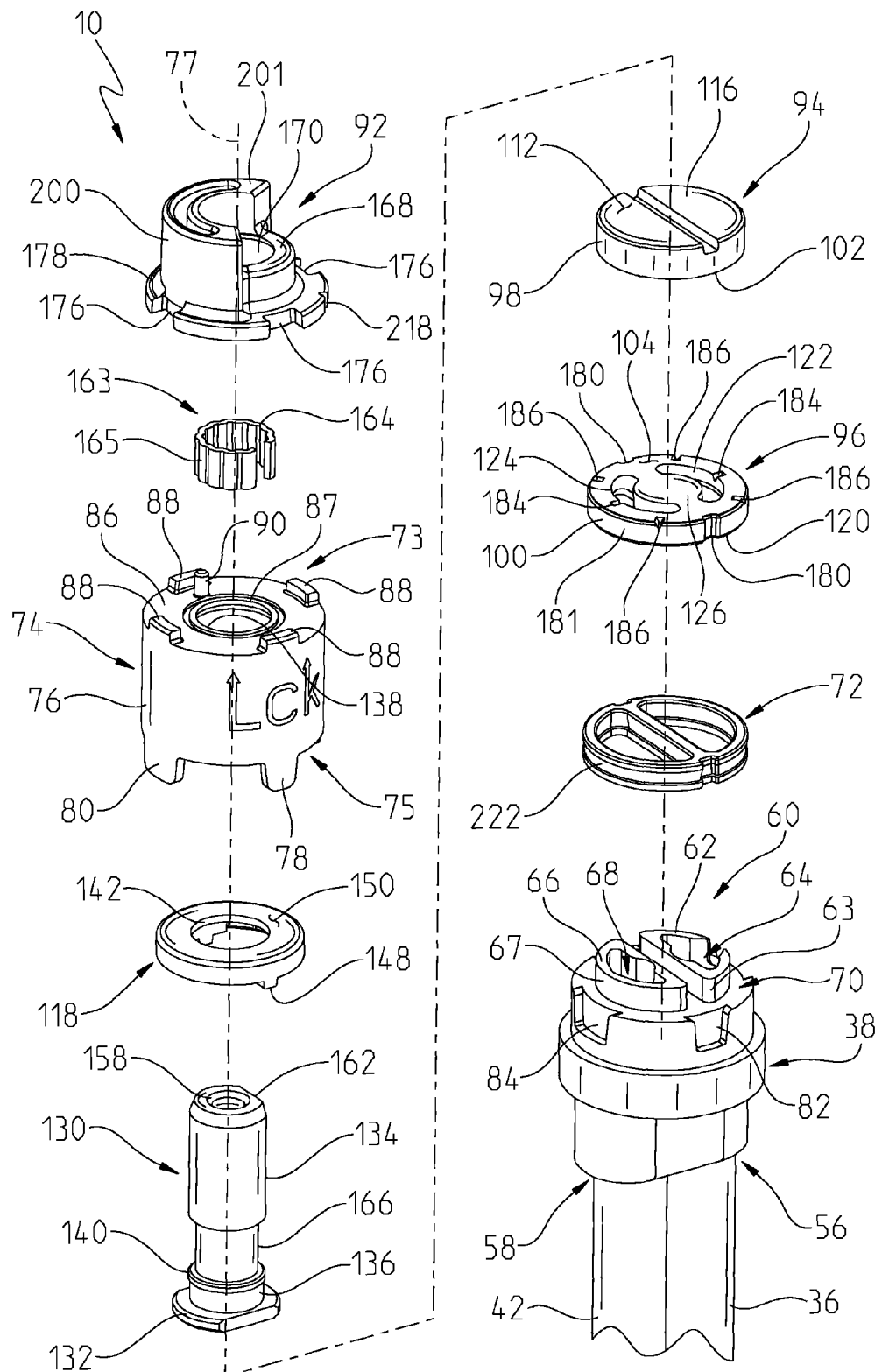
FIG. 4 is an exploded top perspective view of the cold water valve cartridge of FIG. 3.
Figure 5:
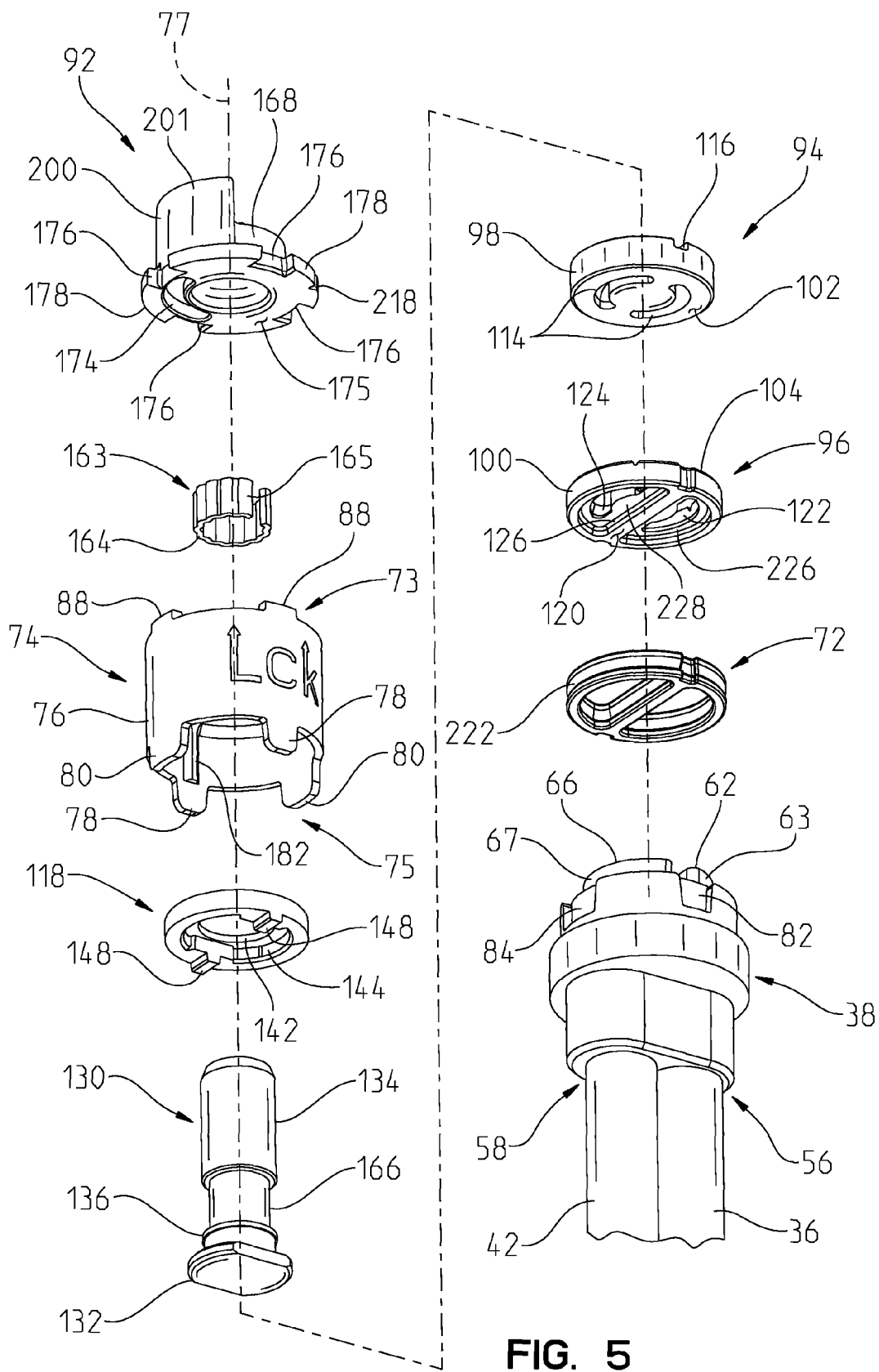
FIG. 5 is a exploded bottom perspective view of the valve cartridge of FIG. 4.

The valve housing 74 further includes an end wall 86 at the first end 73 extending radially inwardly from the side wall 76 and defining a central opening 87 (FIG. 4). A plurality of alignment tabs 88 extend longitudinally outwardly (upwardly in FIG. 4) from the end wall 86. Illustratively, four alignment tabs 88 are circumferentially spaced 90 degrees from each other. A positioning pin 90 also extends outwardly from the end wall 86. As further detailed herein, the tabs 88 and the pin 90 cooperate with a cap 92 to facilitate proper angular orientation between the cap 92 and the valve housing 74. In one illustrative embodiment, the valve housing 74 is molded from a glass filled polymer, such as Amodel® polyphthalamide (PPA), available from Solvay Advanced Polymers, LLC of Alpharetta, Ga.

Figure 6A:
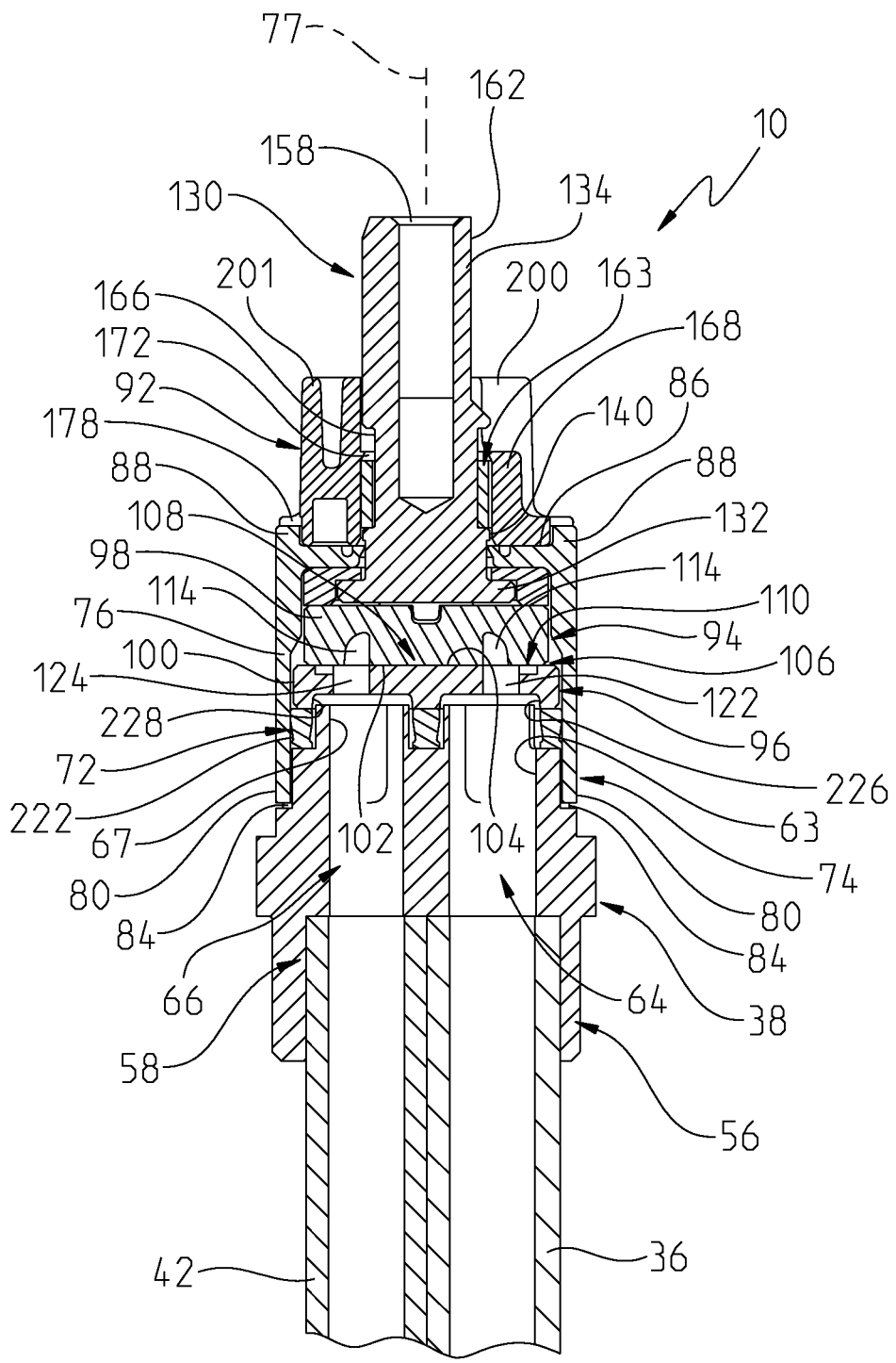
FIG. 6A is a cross-sectional view taken along line 6A-6A of FIG. 3.
Figure 13:
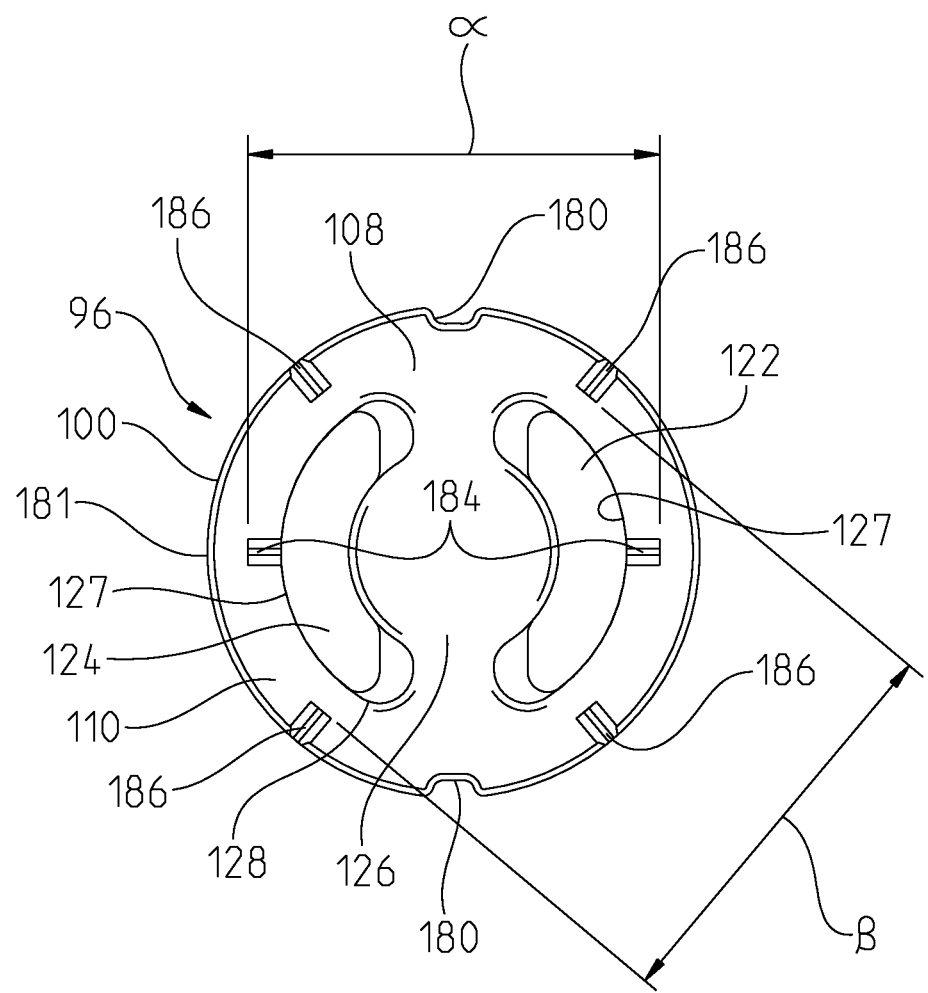
FIG. 13 is a top plan view of an illustrative lower fluid flow plate of the valve cartridge of FIG. 3.
Figure 14:
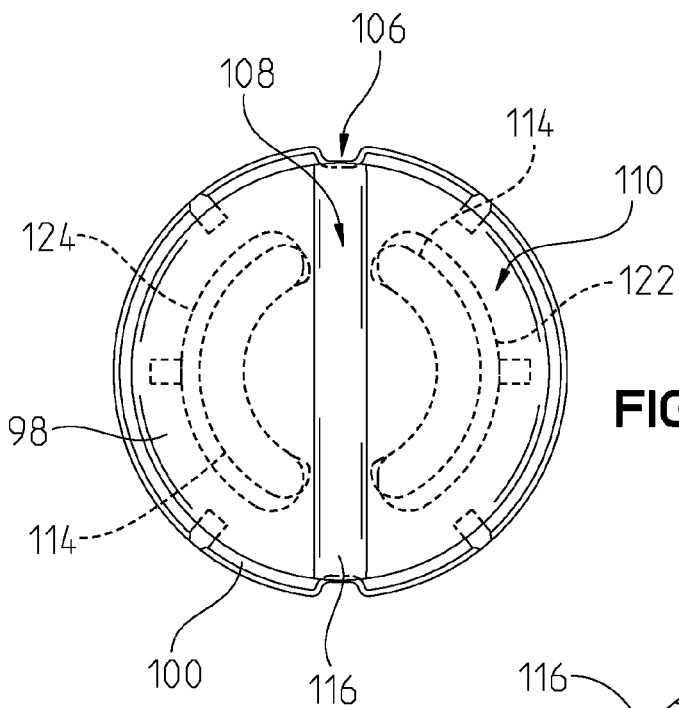
FIG. 14 is a top plan view showing an illustrative upper fluid flow plate oriented in an off position relative to the lower fluid flow plate.

A pair of valve or fluid flow control members 94 and 96 are received within the housing 74. Illustratively, the valve members 94 and 96 include a first or upper fluid flow plate 98 and a second or lower fluid flow plate 100, respectively. Both fluid flow plates 98 and 100 are illustratively formed of an alumina ceramic. The first fluid flow plate 98 includes a first sealing surface 102 configured to sealingly engage a second sealing surface 104 of the second fluid flow plate 100. More particularly, the first sealing surface 102 sealingly engages the second sealing surface 104 to define a common interface 106 including an inner portion 108 and an outer portion 110 positioned radially outwardly form the inner portion 108 (FIGS. 6A, 13, 14). The first fluid flow plate 98 includes an outer surface 112 opposite the first sealing surface 102. A pair of arcuate blind connecting recesses 114 extend inwardly from the first sealing surface 102 and are sealed from (i.e., do not extend into) the outer surface 112. A groove 116 is formed within the outer surface 112 and is configured to cooperate with a spacer 118 for driving the first fluid flow plate 98 in rotation about the longitudinal axis 77.

The second fluid flow plate 100 includes a lower or outer surface 120 opposite the second sealing surface 104. A first or inlet fluid opening 122 extends through the plate 100 between the outer surface 120 and the second sealing surface 104. A second or outlet fluid opening 124 likewise extends through the plate 100 between the outer surface 120 and the second sealing surface 104. The first fluid opening 122 is separated from the second fluid opening 124 by a sealing bridge 126. The openings 122 and 124 define boundaries between the inner portion 108 and the outer portion 110 of the common interface 106 between the first and second fluid flow plates 98 and 100. More particularly, the outer edges 127 of the openings 122 and 124 define the circumferential inner boundary 128 of the outer portion 110. As shown in FIG. 13, the boundary 128 connects the outer edges 127 to distinguish the inner portion 108 (illustratively defined by the portion of the sealing bridge 126 extending between the openings 122 and 124) from the outer portion 110. The first fluid opening 122 is aligned and in fluid communication with the inlet port 64 of the base 38, while the second fluid opening 124 is aligned and in fluid communication with the outlet port 68 of the base 38. As further detailed herein (FIGS. 14-16), rotation of the first fluid flow plate 98 relative to the second fluid flow plate 100 alters the position of the connecting recesses 114 relative to the first and second fluid openings 122 and 124, thereby adjusting the rate of fluid flow from the first fluid opening 122 to the second fluid opening 124.

A pair of recesses 180 in the outer edge 181 of the second fluid flow plate 100 engage with a pair of ribs 182 molded into the housing 74 to prevent rotation therebetween. Cleaning notches or channels 184 and 186 are illustratively formed in the second plate 100 to allow for debris or mineral deposits trapped between the plates 98 and 100 to be removed from the sealing surfaces 102 and 104 defining the common interface 106. A first set of inner cleaning channels 184 are formed within the inner boundary 128 of the common interface 106 of the sealing surfaces 102 and 104. More particularly, the inner cleaning channels 184 are in fluid communication with the outer edges 127 of the first and second openings 122 and 124 of the second fluid flow plate 100. A second set of outer cleaning channels 186 are formed within the outer boundary 190 of the common interface 106 of the sealing surfaces 102 and 104. More particularly, the outer cleaning channels 186 are in fluid communication with an outer edge 181 of the second fluid flow plate 100.

As shown in the illustrative embodiment of FIG. 13, the inner cleaning channels 184 extending from the inside edge 127 extend in a radial direction proximate to the outer cleaning channels 186 extending from the outside edge. As such, there is no substantial radial band of sealing surfaces 102 and 104 that is not cleaned. The common interface 106 of sealing surfaces 102 and 104 thereby define a serpentine path extending circumferentially between cleaning channels 184 and 186. In one illustrative embodiment, the distance a between the outermost edges of diametrically opposed inner cleaning channels is substantially equal to or slightly greater than (within approximately 0.002 inches) the distance between the innermost edges of diametrically opposed outer cleaning channels 186. As such, debris within the common interface 106 not collected by the inner cleaning channels 184 is likely to be collected by the outer cleaning channels 186. Such debris is thereby removed or expelled in a generally radial direction from the common interface 106.

A stem 130 extends along the longitudinal axis 77 of the housing 74 and is operably coupled to the first fluid flow plate 98 through the spacer 118. More particularly, the stem 130 is configured to rotate the spacer 118 which, in turn, rotates first fluid flow plate 98 about the longitudinal axis 77 in order to control the flow of fluid from the inlet conduit 36 through the outlet conduit 42.

The stem 130 includes a base 132 and a shaft 134, and is illustratively formed of brass. The base 132 is received within the spacer 118, while the shaft 134 extends through the opening 87 of the housing 74. Illustratively, the shaft 134 is substantially cylindrical and includes a first groove 136 which receives an inner edge 138 of the end wall 86 of the housing 74 such that it is retained in place, illustratively through a snap-fit coupling with a retaining lip 140. The coupling between the shaft 134 and the end wall 86 secures the stem 130 within the housing 74 so that a downward load on the stem 130 will not tend to dislodge the fluid flow plates 98, 100 or the gasket 72. It also prevents a load on the stem 130 from adversely impacting the fluid flow plates 98, 100.

As noted above, the spacer 118 is operably coupled to the base 132 of the stem 130 to rotate therewith. More particularly, the spacer 118 includes an upper opening 142 configured to receive the shaft 134, and a lower recess 144 configured to receive the base 132. The recess 144 has a shape cooperating with the base 132 in order to prevent relative rotation therebetween.

The spacer 118 includes downwardly extending keys or tabs 148 received within the groove 116 of the first fluid flow plate 98. As such, the spacer 118 is operably coupled to the stem 130 such that rotation of the stem 130 drives the first fluid flow plate 98 in rotation. The spacer 118 is illustratively formed of a glass filled polymer, such as polybutylene terephthalate (PBT). The upper surface 150 of the spacer 118 provides a bearing surface against the end wall 86 of the housing 74 in order to prevent wear on the stem 130 (which is illustratively formed of brass).

A user input, such as lever 20 or knob 26, is coupled to the shaft 134 of the stem 130. In one illustrative embodiment shown in FIGS. 10 and 11, the knob 26 is secured to the stem 130 by a fastener, such as a screw 156 engaging a threaded opening 158 at the end of the shaft 134. In another illustrative embodiment shown in FIG. 12, a fastener, such as a set screw 160 engages a flat portion 162 of the shaft 134 to secure the lever 154 to the stem 130.

An elastically deformable spacer 163 is illustratively supported within a second groove 166 formed within the shaft 134 of the stem 130 and axially spaced from the first groove 136. Illustratively, the spacer 163 is formed of a polymer, such as an acetal. The spacer 163 is pressed between a cylindrical side wall 168, defining a bore 170 in the cap 92, and groove 166 of shaft 134 to provide torsional resistance and to act as an anti-wobble feature for the stem 130. The spacer 163 illustratively comprises a C-shaped clip 164 including a convoluted or wave-like outer surface 165.

Figure 6B:
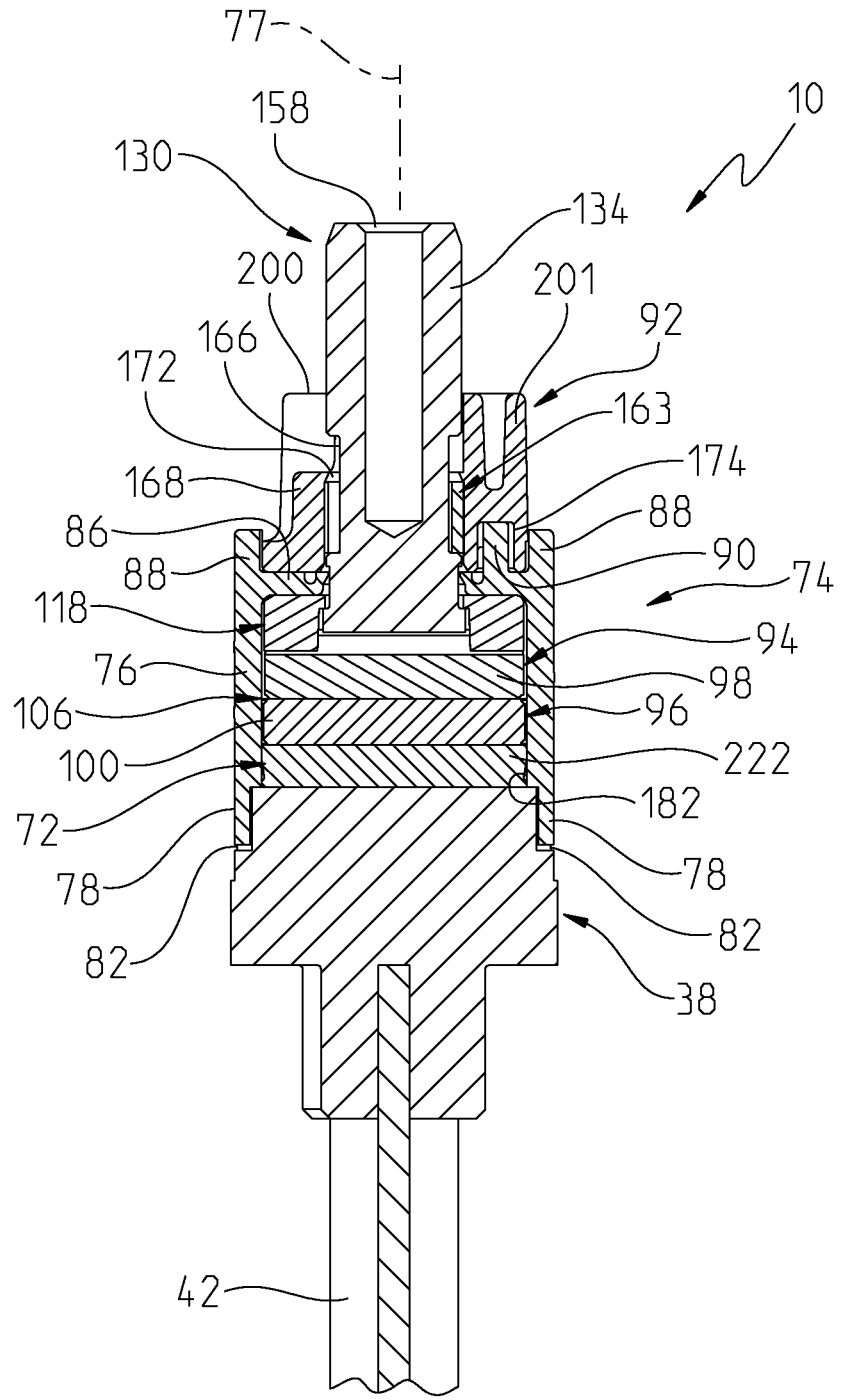
FIG. 6B is a cross-sectional view taken along line 6B-6B of FIG. 3.
Figure 7B:
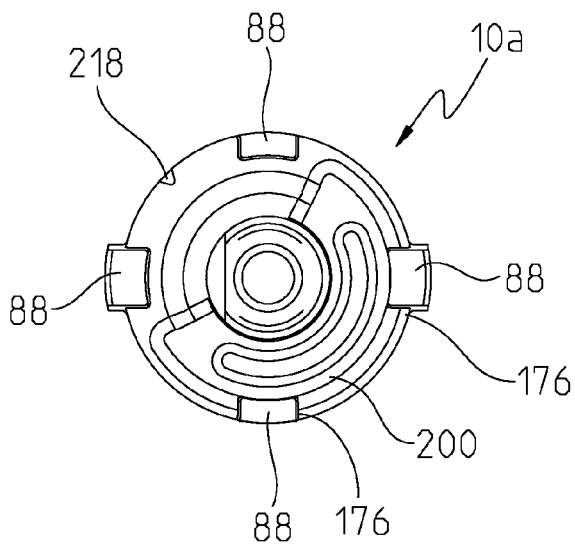
FIG. 7B is a top plan view of the valve cartridge of FIG. 7A.

The cap 92 illustratively includes a snap ring or lip 172 which is received within the groove 166 on the stem 130, thereby allowing the cap 92 to rotate while limiting axial movement along longitudinal axis 77 (FIGS. 6A and 6B). Relative rotation of the cap 92 relative to the housing is guided by pin 90 molded into the housing 74 engaging an arcuate slot 174 molded into the lower surface 175 of the cap 92. The cap 92 is illustratively rotationally fixed in position relative to the housing 74 by the alignment tabs 88 of the housing 74 being received within corresponding openings or notches 176 formed within a base 178 of the cap 92. There is sufficient axial play between the cap 92 and the stem 130 to permit the openings 176 to become disengaged from the tabs 88, thereby allowing rotation between the cap 92 and the housing 74. However, the pin 90 illustratively remains within the arcuate shot 174 to guide adjustment of the cap 92 relative to the housing 74. As further detailed herein, for the hot lever and hot knob arrangements (FIGS. 7A-7C), the cap 92 is rotated fully counterclockwise to the extent permitted by the pin 90 within the slot 174, and with the cap 92 remaining coupled to the housing 74 through the stem 130. For the cold knob arrangement (FIGS. 8A-8C), the entire valve cartridge 10 is rotated 180 degrees from the hot knob or lever arrangement and inserted back into the base 38. When a cold lever arrangement is desired (FIGS. 9A-9C), the cap 92 is axially displaced from the housing 74, rotated 90 degrees clockwise, and then moved axially back into engagement with the housing 74.

The cap 92 illustratively includes an arcuate temperature limit stop 200 extending upwardly from the base 178. More particularly, the limit stop 200 includes an arcuate wall 201 formed integral with the side wall 168. An engagement member 202 is supported for rotation with the stem 130 and is configured to selectively engage the limit stop 200 to limit rotation of the stem 130 and the first fluid flow plate 98. Illustratively, the engagement member 202 comprises a projection 204 coupled to the knob 26 (FIGS. 10 and 11) or a projection 205 coupled to the lever 20 (FIG. 12). Each projection 204, 205, includes opposing surfaces 206 configured to selectively engage surfaces 207 of the limit stop 200. As noted above, the cap 92 is operably coupled to the stem 130 for limited axial movement, and operably coupled to the valve housing 74 for rotational adjustment relative to the valve housing 74. Rotational adjustment of the cap 92 relative to the valve housing 74 alters the angular position of the limit stop 200, thereby adjusting the rotational path available to the user input (knob 26 or lever 20), stem 130, and hence, the first fluid flow plate 98. The cap 92 is illustratively molded from a polymer such as udel polysulfone.

Figure 10:
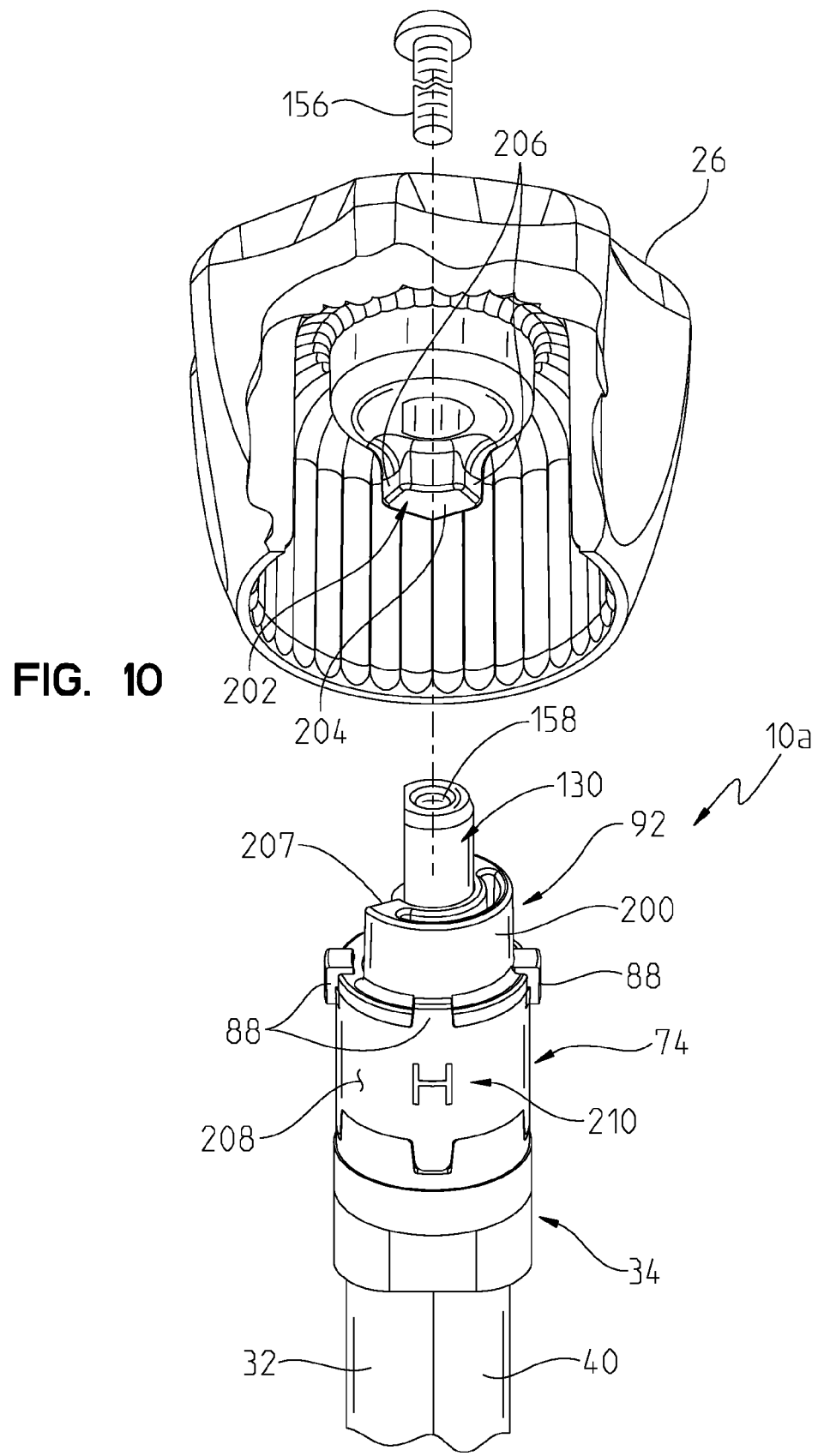
FIG. 10 is a perspective view, with a partial cut-away thereof, showing a knob positioned above the valve cartridge in the hot water orientation of FIG. 7A.
Figure 11:
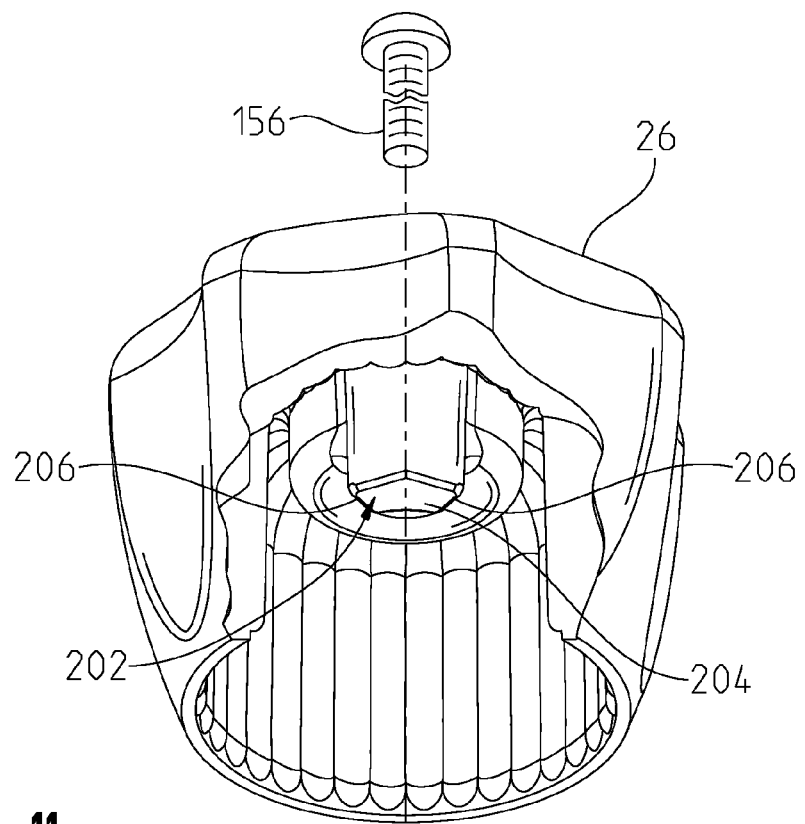
FIG. 11 is a perspective view, with a partial cut-away thereof, showing a knob positioned above the valve cartridge in the cold water knob orientation of FIG. 8A.
Figure 11:
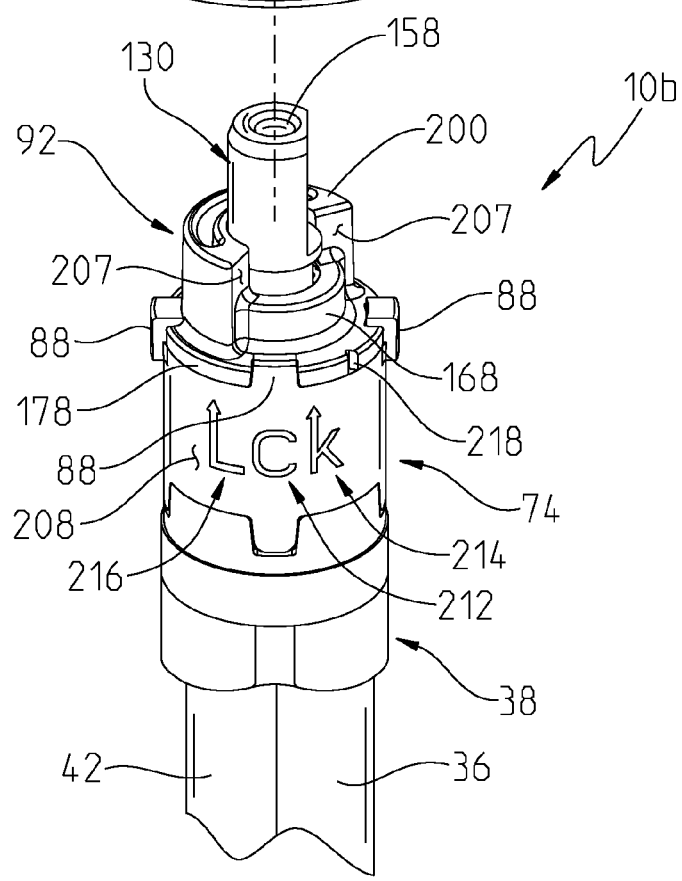
Figure 12:
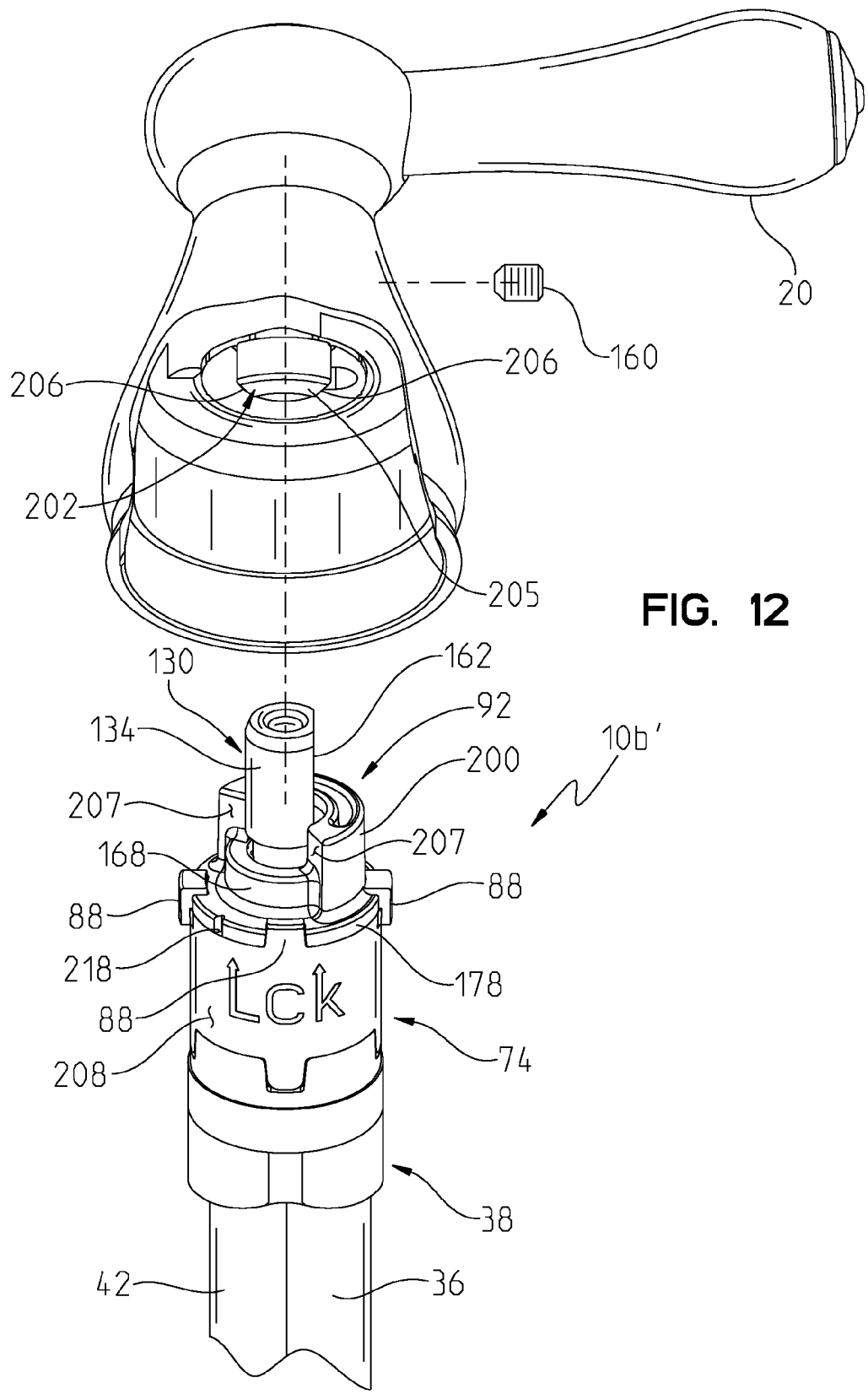
FIG. 12 is an exploded perspective view, with a partial cut-away thereof, showing the valve cartridge of FIG. 9A in the cold water lever orientation of FIG. 9A.

With reference to FIGS. 10-12, the housing 74 illustratively supports a plurality of indicia 210, 212, 214, 216 providing an indication to the user of the rotational path available to the first fluid flow plate 98. More particularly, the illustrative indicia 210, 212, 214, 216 are supported by the outer surface 208 of the side wall 76 and indicate hot or cold orientation, and knob or lever orientation of the valve cartridge 10. In the illustrative embodiment, indicia 210 is in the form of the letter "H" and indicia 212 is in the form of the letter "C." In one illustrative embodiment, the indicia 210, 212, 214, 216 are molded within the side wall 76, although the indicia may be formed in other manners, such as stamping, engraving, or printing. On the left side of indicia 212 is indicia 214 in the form of the letter "K", and indicia 216 in the form of the letter "L" is positioned on the right side of the indicia 212. An indicator 218, illustratively, a notch, is formed in the cap 92 and is alignable with the indicia 212 ("K") or the indicia 214 ("L") to indicate whether the valve cartridge 10 is in a cold water knob or a cold water lever orientation. While the indicia of the illustrative embodiment are in the form of letters, it should be appreciated that other symbols and/or graphics may be utilized.

Gasket 72, illustratively an elastomeric seal, is positioned intermediate the base 38 and the second fluid flow plate 100. In one illustrative embodiment, the gasket 72 is formed of silicone. The gasket 72 provides an axial load or sealing force between the first fluid flow plate 98 and the second fluid flow plate 100. As further detailed herein, the gasket 72 includes an undercut center portion 222 defining a reduced cross-sectional width and configured to provide a control mechanism for the gasket 72 to collapse in order to maintain a minimum load on the first and second fluid flow plates 98 and 100. Illustratively, the gasket 72 is received within the seat 70 defined by walls 62 and 66 formed in the base 38.

The gasket 72 provides a seal between the bottom surface of the first fluid flow plate 98 and the base 38, as well as providing the sealing force to hold the first and second fluid flow plates 98 and 100 together. The walls 62 and 66 of base 38 may be telescopingly received within the first and second openings 122 and 124 of the second fluid flow plate 100. More particularly, the bosses 63 and 67 defined by the walls 62 and 66 extend up from the base 38 into recesses 226 and 228 formed in the lower surface 120 of the second fluid flow plate 100 to provide burst pressure resistance. The recesses 226 and 228 are enlarged portions of openings 122 and 124 configured to receive an upper end of the bosses 63 and 67. The bosses 63 and 67 prevent the gasket 72 from creeping into the space between the base 38 and the fluid flow plate 100. In one illustrative embodiment, the arrangement between the bosses 63 and 67, the fluid flow plate 100 and the gasket 72 is configured to provide compliance with a 500 psi burst pressure requirement. Water pressure also holds the first and second fluid flow plates 98 and 100 together, which is facilitated by the second fluid flow plate 100 being larger in diameter than the first fluid flow plate 98.

Figure 15:
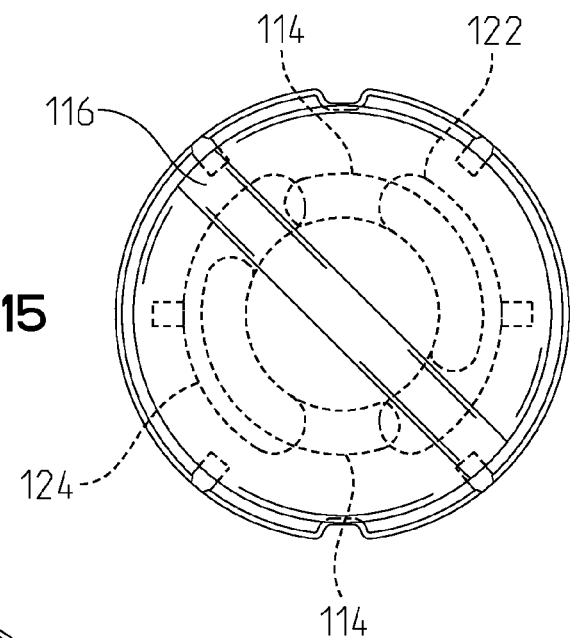
FIG. 15 is a top plan view similar to FIG. 14 showing the upper fluid flow plate oriented in a partially on position relative to the lower fluid flow plate.
Figure 16:
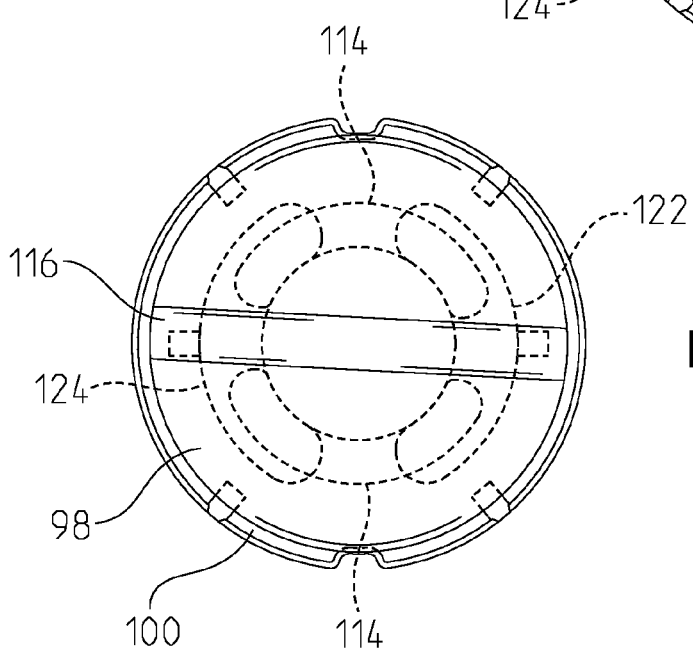
FIG. 16 is a top plan view similar to FIG. 14 showing the upper fluid flow plate oriented in a full on position relative to the lower fluid flow plate.

With reference to FIGS. 6A and 14-16, in operation cold water is supplied through the cold water conduit 36 and passes through the inlet port 64 of the base 38 into the inlet opening 122 of the second fluid flow plate 100. When the valve cartridge is in a closed position as shown in FIG. 14, fluid is prevented from passing to the second opening 124 of the second fluid flow plate 100. Upon rotating the first fluid flow plate 98 in a counterclockwise direction as shown in FIG. 15, the connecting recesses 114 provide for fluid communication between the first opening 122 and the second opening 124 of the second fluid flow plate 100. As such, water flows from the inlet conduit 36 to the outlet conduit 42. FIG. 16 illustrates the valve cartridge 10 in a fully open position where the first fluid flow plate 98 is rotated approximately 90 degrees to the second fluid flow plate 100, thereby permitting maximum fluid flow between the first opening 122 and the second opening 124 of the second fluid flow plate 100 through the connecting recesses 114 of the first fluid flow plate 98.

Figure 7A:
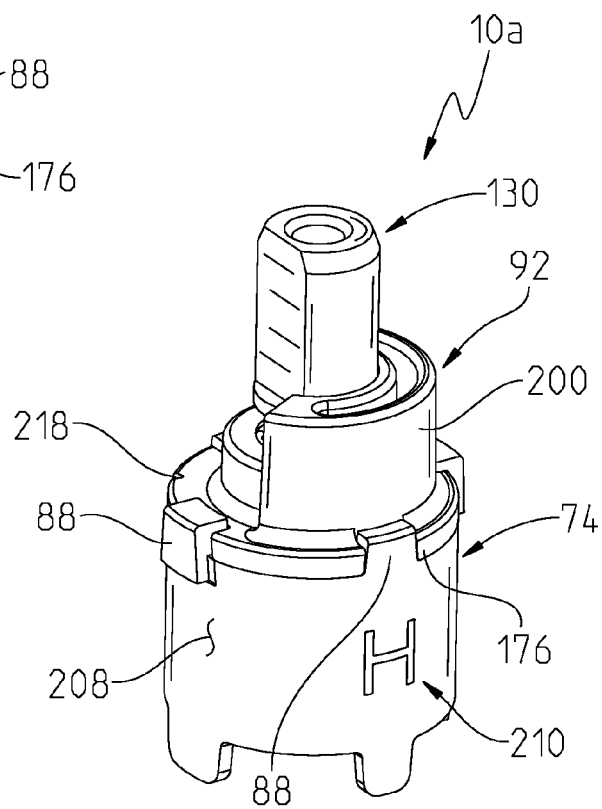
FIG. 7A is a perspective view of the valve cartridge of FIG. 3 in a hot water orientation.
Figure 7C:
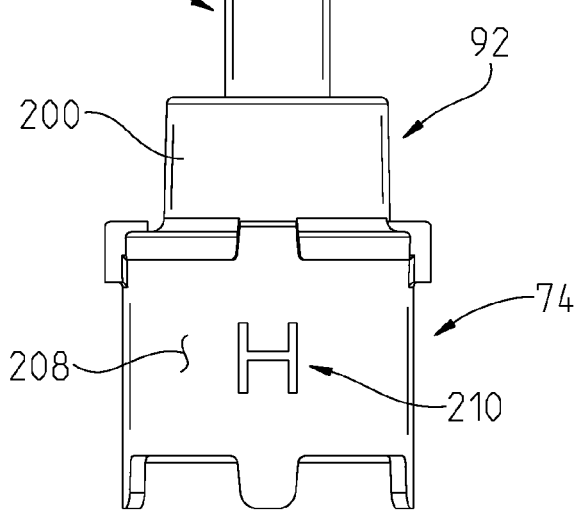
FIG. 7C is a side elevational view of the valve cartridge of FIG. 7A.

As noted above, the valve cartridge 10 of the present disclosure may find universal use as a hot water lever control valve 12, a hot water knob control valve 12', a cold water knob valve 14, and a cold water lever valve 14'. FIG. 7A is a perspective view of the valve cartridge 10a in a hot water lever or hot water knob configuration. As noted above, in the conventional hot water control valve 12, 12' for both levers and knobs 20 and 26, the valve stem 130 is rotated in a counterclockwise direction to activate water flow. Engagement between the engagement member 202 supported by the lever 20 and/or knob 26 with the limit stop 200, limits the amount of rotational travel of the lever or knob 20, 26. In other words, cooperation between the engagement member 202 of the user input 20, 26 and the limit stop 200 of the cap 92 defines a path of travel for the stem 130 and, as such, the first fluid flow plate 98. As shown in FIGS. 7A and 7C, the hot water indicia 210 supported on the valve housing 74 is facing the user.

Figure 8B:
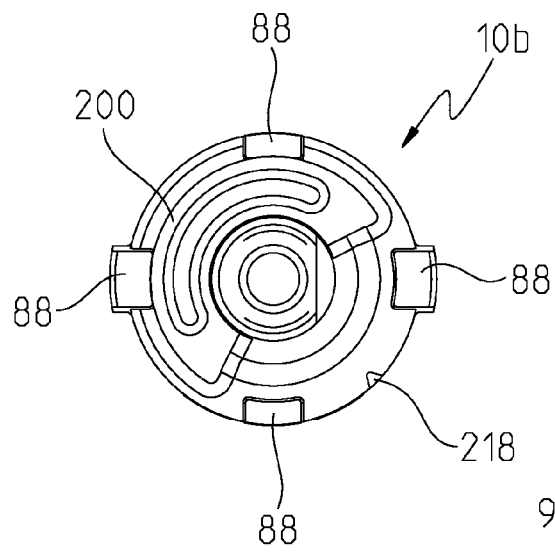
FIG. 8B is a top plan view of the valve cartridge of FIG. 8A.
Figure 8A:
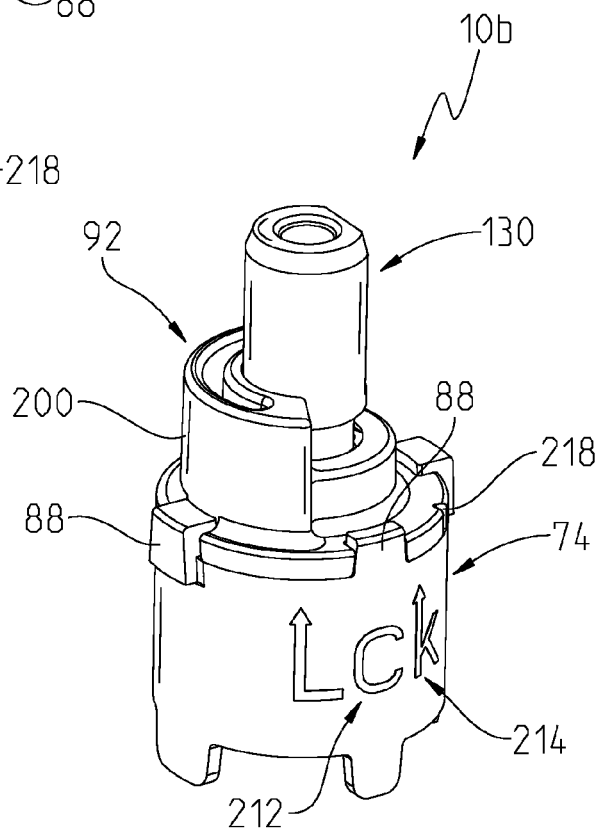
FIG. 8A is a perspective view of the valve cartridge of FIG. 3 in a cold water knob orientation.
Figure 8C:
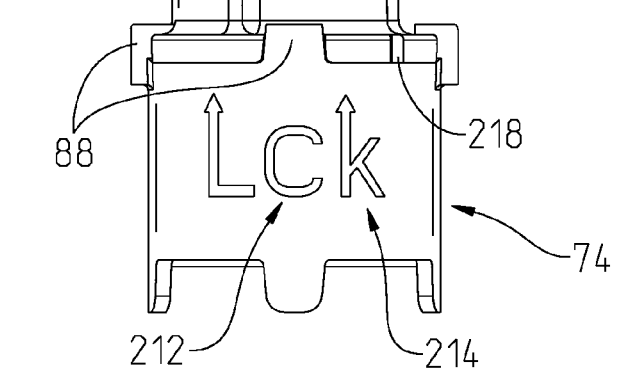
FIG. 8C is a side elevational view of the valve cartridge of FIG. 8A.

In order to convert from a hot water control valve 12 to a cold water knob control valve 14, the entire valve cartridge 10a is removed from base 34 and rotated 180 degrees about the longitudinal axis 77. The rotated valve cartridge 10b is then coupled to base 38 to the position shown in FIGS. 8A-8C. In FIGS. 8A-8B, the cap 92 of valve cartridge 10b is oriented for cold water knob operation of the valve cartridge 10 with the cold water indicia 212 facing the user. As shown in FIGS. 8A and 8C, the indicator 218 of the cap 92 is positioned adjacent the indicia 214 on the housing 74 for providing an indication to the user of the cold water knob orientation.

In order to convert to a cold water lever control valve 14' from the cold water knob control valve 14, the cap 92 of valve cartridge 10b is rotated 90 degrees clockwise as shown in FIGS. 9A-9C to define valve cartridge 10b. More particularly, the cap 92 is lifted axially upwardly relative to the stem 130 and the housing 74 and then rotated 90 degrees. Receipt of the tabs 88 within the openings 176 of the cap 92 facilitate proper orientation to maintain angular positioning between the cap 92 and the housing 74. The relative positioning of the limit stop 200 permits for the required clockwise orientation of the lever 20 relative to the valve cartridge 10 and, more particularly, for the engagement between the engagement member 202 of the lever 20 and the limit stop 200. As shown in FIGS. 9A and 9C, the indicator 218 of the cap is substantially aligned with the indicia on the housing 74 to provide the user with the indication that the valve cartridge 10 is in the cold water lever orientation.

Figure 17:
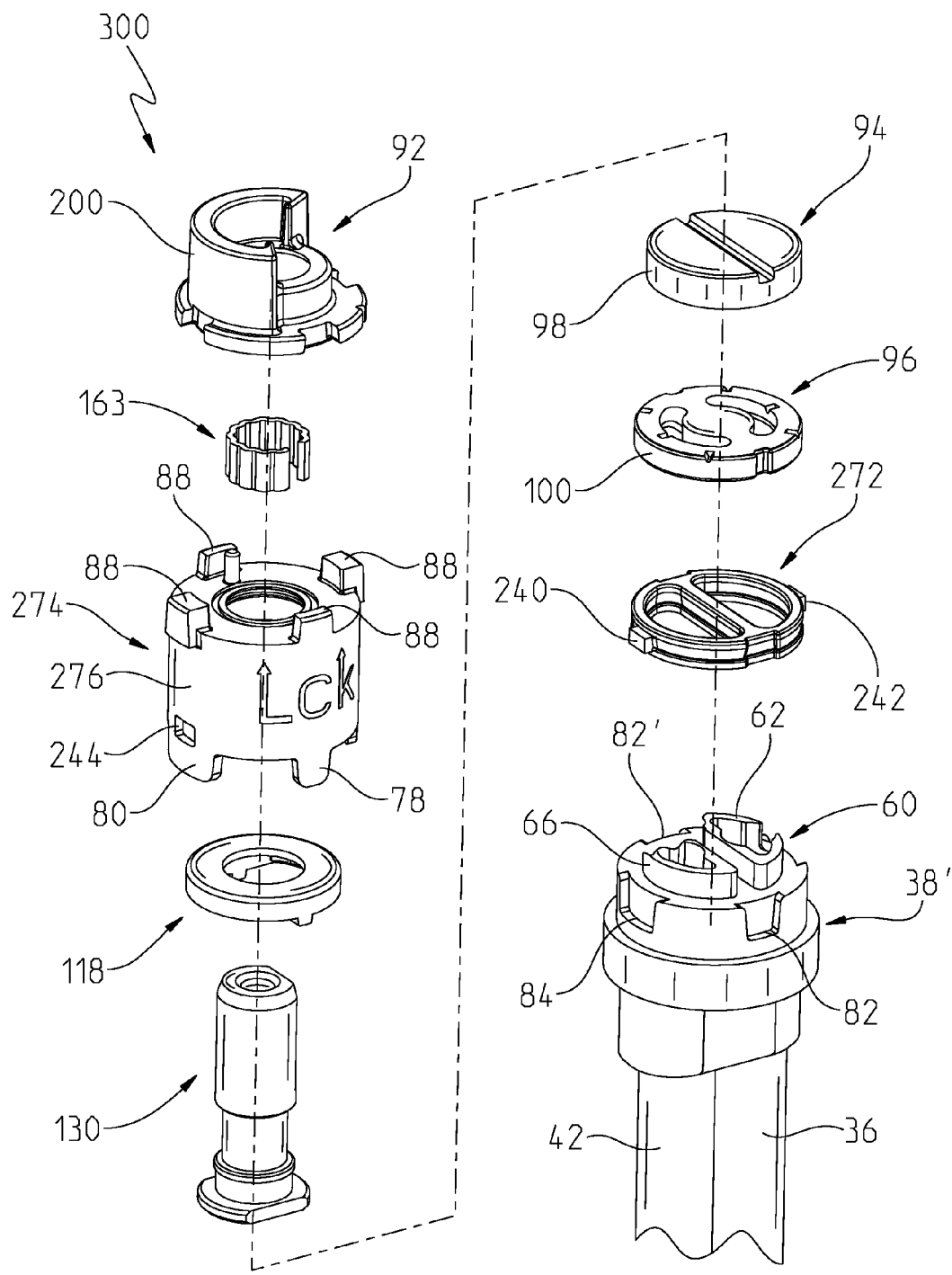
FIG. 17 is a top exploded perspective view of a further illustrative embodiment valve cartridge of the present disclosure, with a partial cutaway of the wall around the outlet port of the base.
Figure 18:
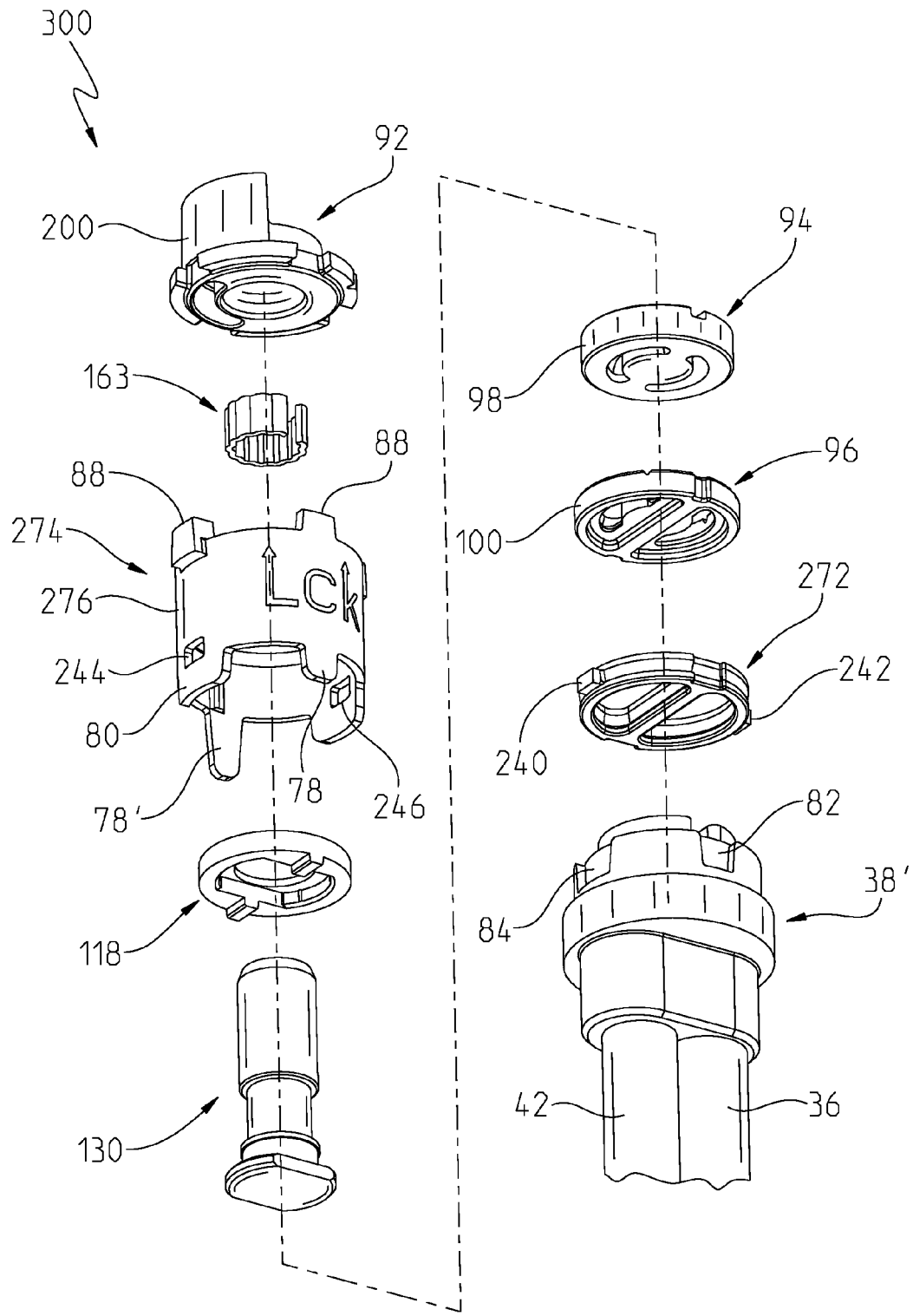
FIG. 18 is a bottom exploded perspective view of the valve cartridge of FIG. 17.

FIGS. 17 and 18 show a further illustrative embodiment of the valve cartridge 300 of the present disclosure, wherein components similar to those detailed above are identified with like reference numbers. In the embodiment of FIGS. 17 and 18, the gasket 272 is substantially similar to gasket 72 detailed above but includes a pair of diametrically opposed outwardly extending retaining tabs 240 and 242. Retaining tabs 240 and 242 are configured to be received within slots 244 and 246, respectively, formed within the cylindrical side wall 276 of the valve housing 274. The retaining tabs 240 and 242 facilitate retention of the gasket 272 within the valve cartridge 300. Further, the gasket 272 assists in retaining the first and second fluid flow plates 98 and 100 within the valve housing 274.

Valve housing 274 also includes diametrically opposed locating tabs 78 and 80 as detailed above. However, one of the tabs 78' extends axially outwardly (downwardly in FIG. 18) from side wall 276 further than the other tabs 78 and 80 in order to facilitate positioning of the valve cartridge 300 relative to the base 38' in a single orientation. More particularly, one of the cooperating recesses 82' is axially longer than the other recesses 82 and 84 for receiving tabs 78'.

Figure 19:
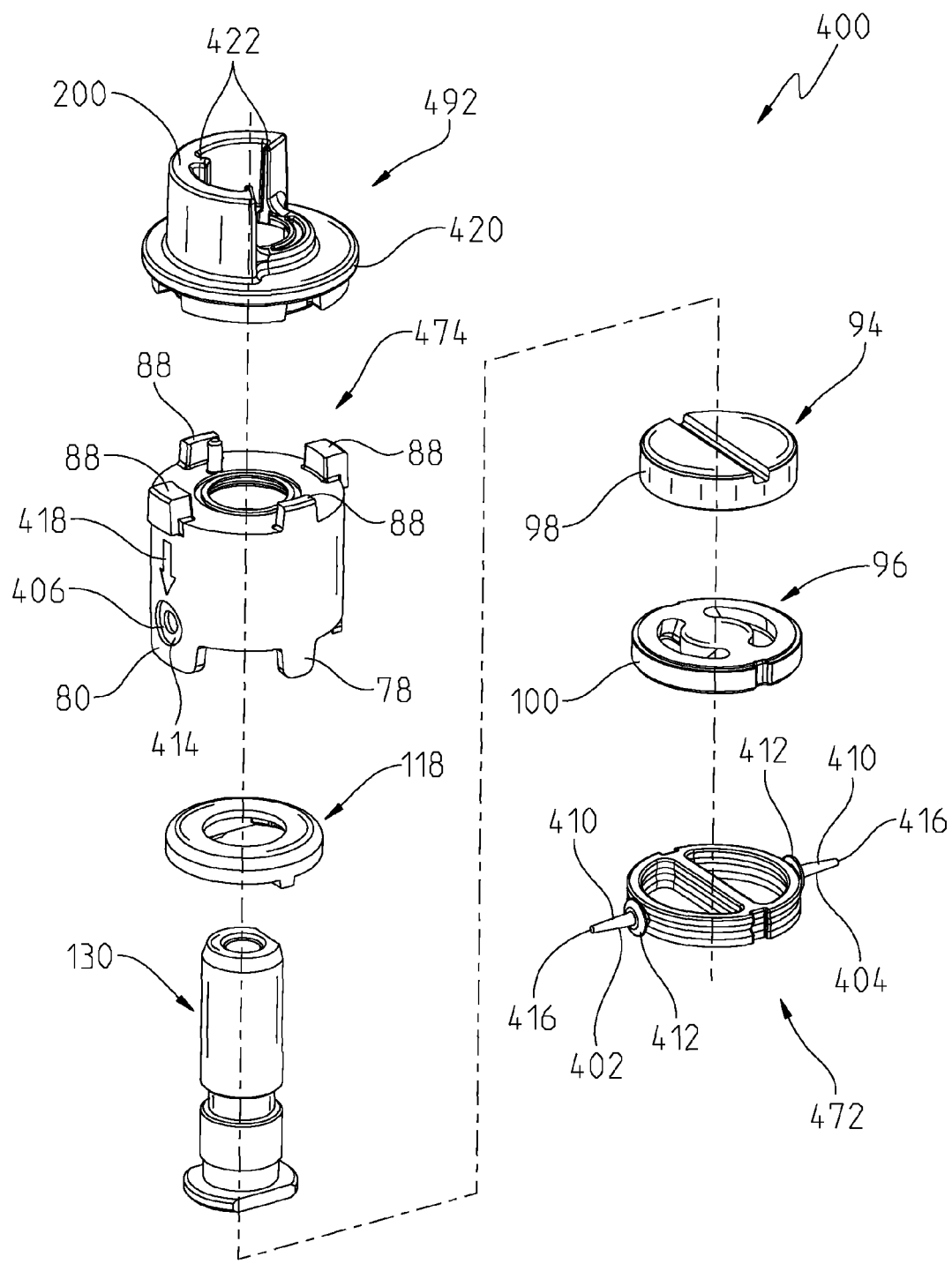
FIG. 19 is a top exploded perspective view of another illustrative embodiment valve cartridge of the present disclosure.
Figure 22:
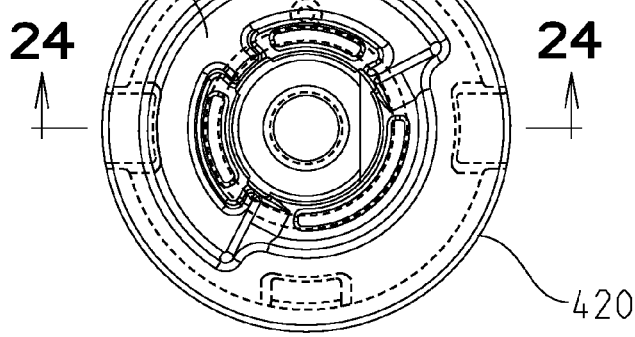
FIG. 22 is top plan view of the valve cartridge of FIG. 19 in a cold water knob orientation.
Figure 23:
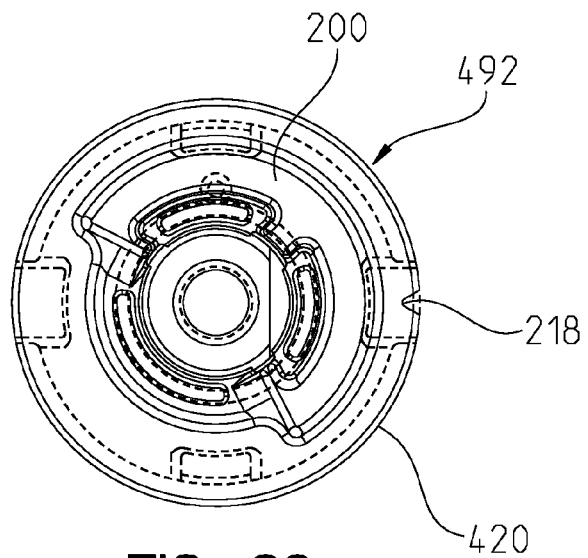
FIG. 23 is top plan view of the valve cartridge of FIG. 19 in a cold water lever orientation.
Figure 24:
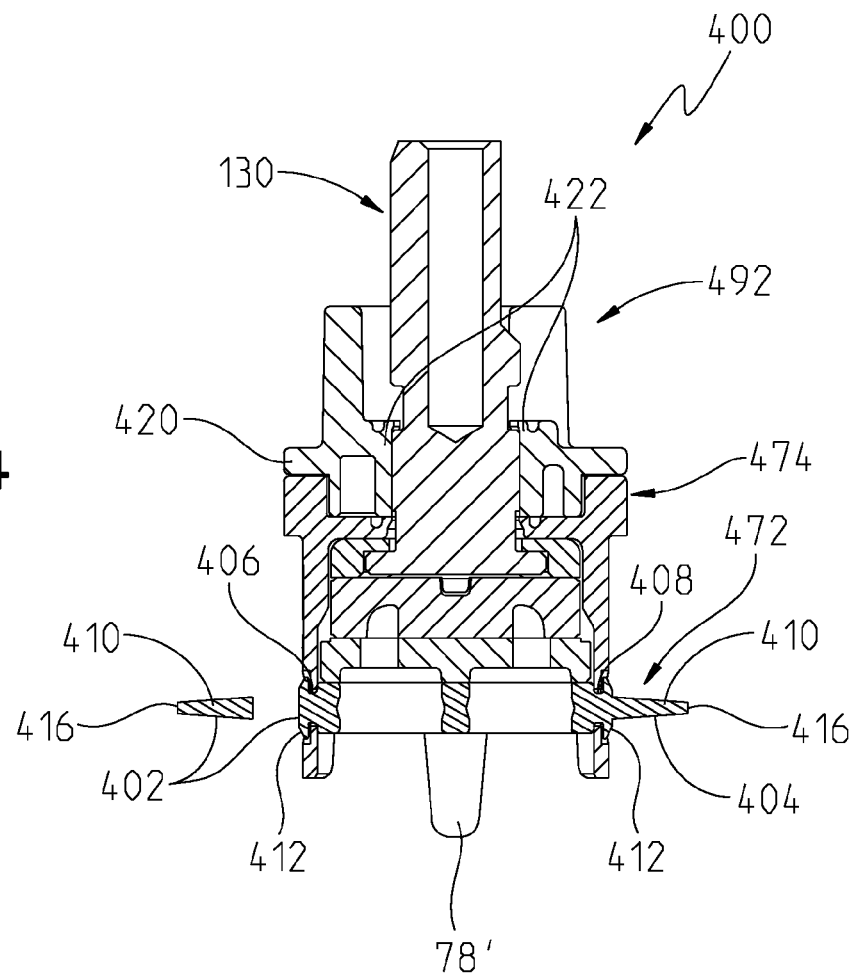
FIG. 24 is a cross-sectional view taken along line 24-24 of FIG. 22.

FIGS. 19-24 show another illustrative valve cartridge 400 of the present disclosure, wherein components similar to those detailed above are identified with like reference numbers. The valve cartridge 400 includes resilient gasket 472 similar to gasket 272, and which includes retaining members 402 and 404 configured to be received within openings 406 and 408 of the valve housing 474. The retaining members 402 and 404 each include a frusto-conical grip portion 410 and a retaining flange 412 positioned radially inwardly therefrom. With reference to FIGS. 19 and 24, the grip portions 410 of the gasket 472 are pulled through the openings 406 and 408 of the housing 474 until the retaining flanges 412 are received within a counterbore 414. Engagement between the flanges 412 and the counterbores 414 retain the gasket 472 to the housing 474. As such, the gasket 472 assists in retaining the first and second fluid flow plates 98 and 100 within the valve housing 474. As shown in FIG. 24, the tips 416 of the grip portions 410 of the gasket 472 may be removed by a cutting operation prior to assembly of the valve cartridge 400 within the valve body (not shown).

Figure 20:
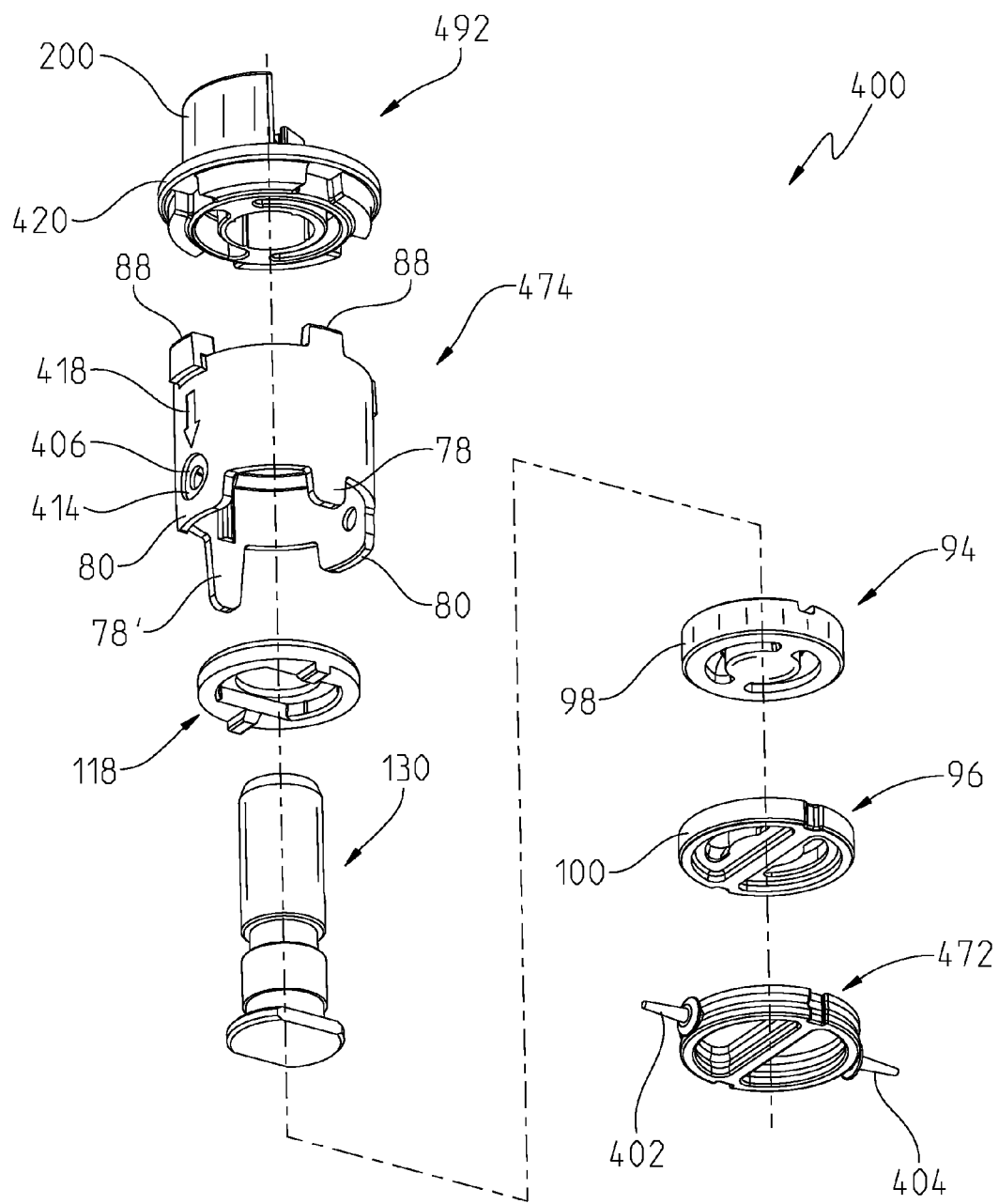
FIG. 20 is a bottom exploded perspective view of the valve cartridge of FIG. 9.

Valve housing 474 includes a single indicia 418 supported on outer surface 208 of the side wall 76. The indicia 418 is illustratively in the form of an arrow and is configured to assist the user in properly orienting the cartridge 400 in hot or cold water orientations. More particularly, the indicia 418 always faces generally toward the outlet or delivery spout 22 (FIGS. 1 and 2). In other words, when facing the front of the cartridge 400, the indicator 418 faces the right for a hot water orientation and faces the left for a cold water orientation (FIGS. 19 and 20.)

Figure 21:
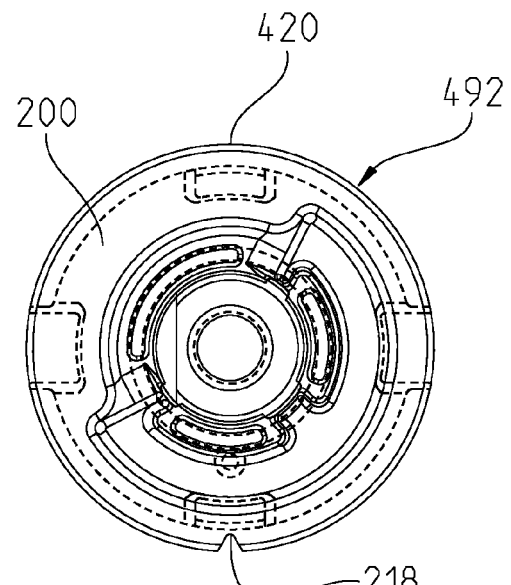
FIG. 21 is a top plan view of the valve cartridge of FIG. 19 in a hot water orientation.

Cap 492 is similar to cap 92 detailed above, and includes temperature limit stop 200. Indicator 218 of the cap 492 may be utilized by the user to identify knob or lever configurations of the valve cartridge 400. FIG. 21 illustrates the indicator 218 in a 6 o'clock position when the temperature limit stop 200 of the cap 492 is in a hot water lever or knob orientation. FIG. 22 illustrates the valve cartridge 400 rotated 180 degrees from the position in FIG. 21. As such, the indicator 218 is in a 12 o'clock position when the temperature limit stop 200 of the cap 492 is in a cold water knob orientation. Finally, FIG. 23 illustrates the indicator 218 rotated 90 degrees from the position in FIG. 22 to a 3 o'clock position when the temperature limit stop 200 of the cap 492 is in a cold water lever position.

The cap 492 includes a radially outwardly extending, annular flange 420 which is configured to be clamped between the valve body and the bonnet nut (not shown) during subsequent assembly. As shown in FIGS. 19 and 20, the spacer 163 supported on the stem 130 (FIGS. 4 and 5) has been replaced with ribs 422 formed integral within the cap 492. The ribs 422 extend radially inwardly and cooperate with the stem 130 to prevent wobble therebetween.

Figure 25:
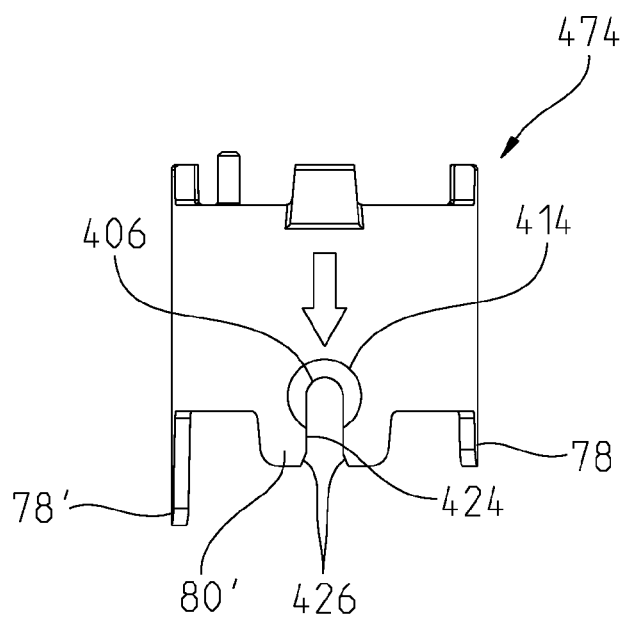
FIG. 25 is a detail view of a further illustrative valve housing for coupling to the gasket of FIG. 19.
Figure 26:
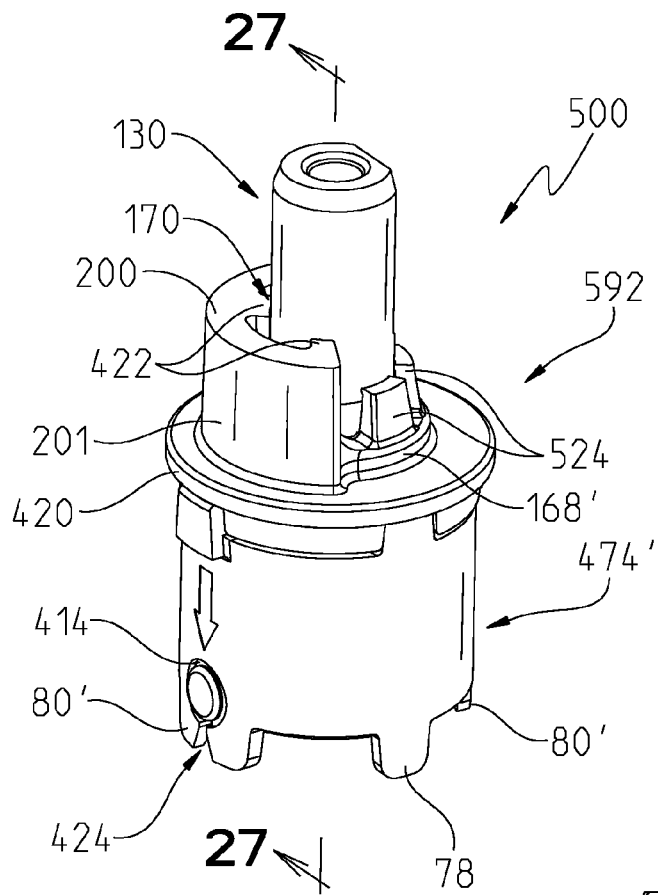
FIG. 26 is a top perspective view of another illustrative embodiment valve cartridge of the present disclosure.
Figure 27:
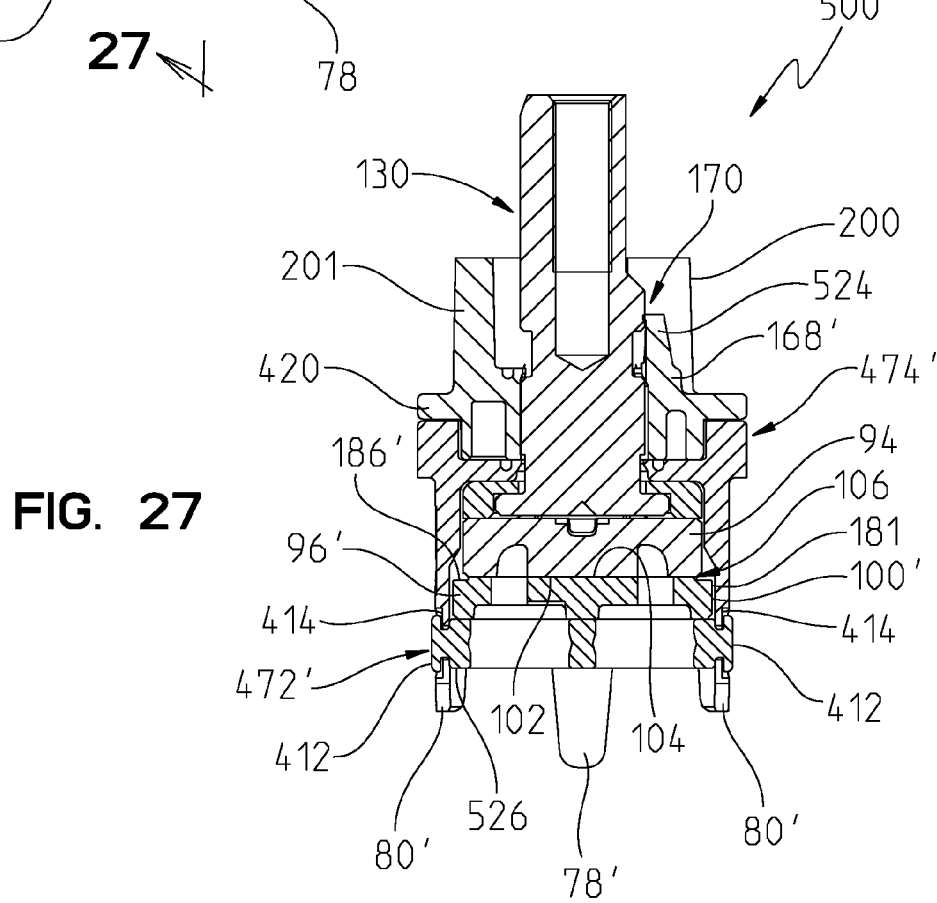
FIG. 27 is a cross-sectional view taken along line 27-27 of FIG. 26.

FIG. 25 illustrates a further embodiment valve housing 474' including an open 25 ended slot 424 in communication with each of the openings 406 and 408. As such, the gasket 472 may be pulled through the slot 424 until the retaining flanges 412 are seated within the counterbores 414. Angled lead-in surfaces 426 facilitate assembly of the gasket 472 to the housing 474'.

A further illustrative valve cartridge 500 of the present disclosure is shown in FIGS. 26-30, wherein components similar to those detailed above are identified with like reference numbers. The cap 592 of the valve cartridge 500 is similar to cap 492 and includes the plurality of radially inwardly extending ribs 422 supported by the limit stop 200. More particularly, the ribs 422 extend radially inward from arcuate wall 201 of the limit stop 200 toward the stem receiving bore 170. A pair of resilient fingers 524 are illustratively positioned generally opposite the ribs 422 and extend inwardly toward the receiving bore 170. The fingers 524 are illustratively supported by side wall 168' and are radially inwardly biased toward the receiving bore 170. The ribs 422 and resilient fingers 524 cooperate to provide support for the stem 130. More particularly, the resilient fingers 524 provide a load against the stem 130 such that the stem 130 is supported between multiple contact points defined by the ribs 422 and the fingers 524, thereby preventing wobble between the stem 130 and the cap 592.

Figure 28:
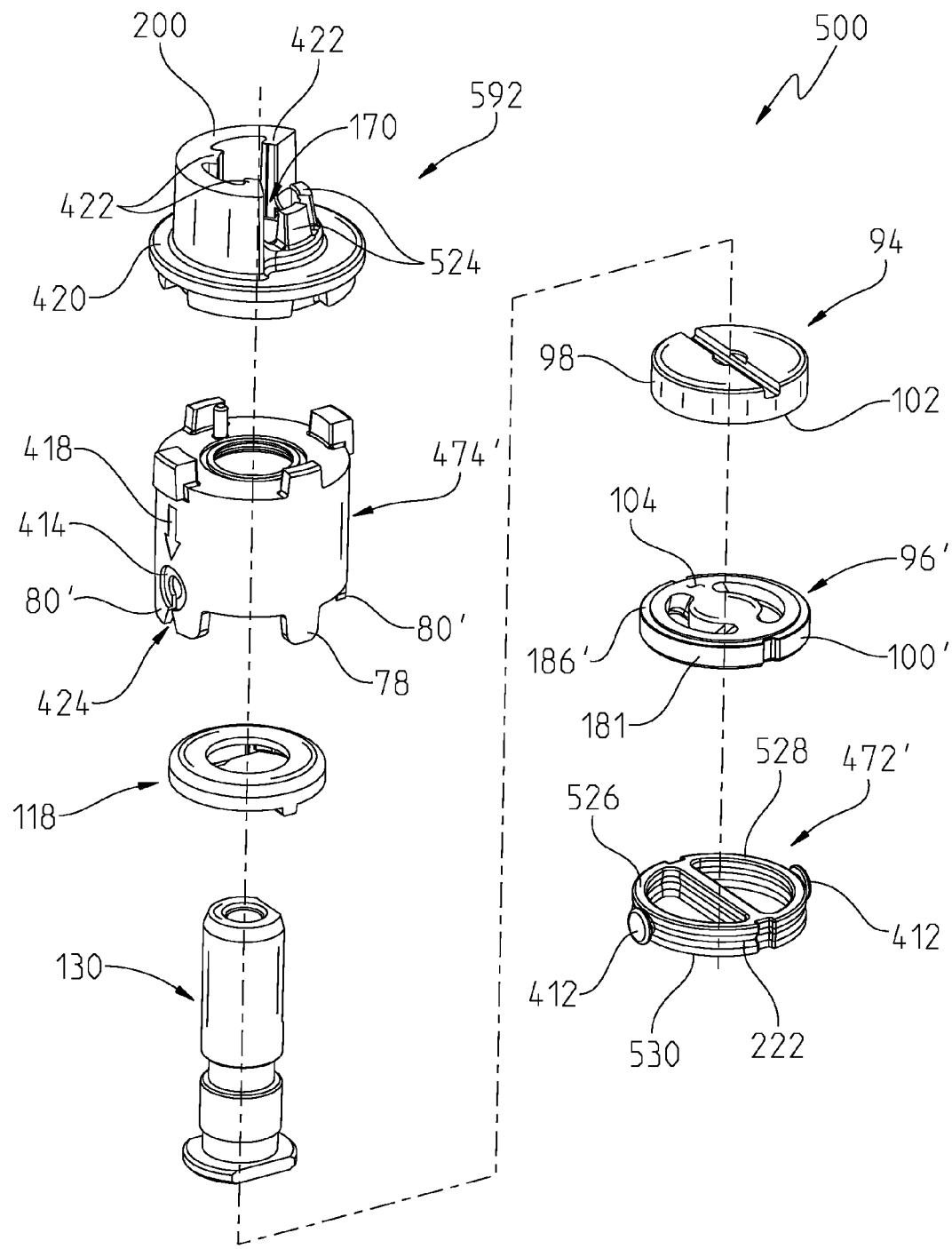
FIG. 28 is a top exploded perspective view of the valve cartridge of FIG. 26.
Figure 29:
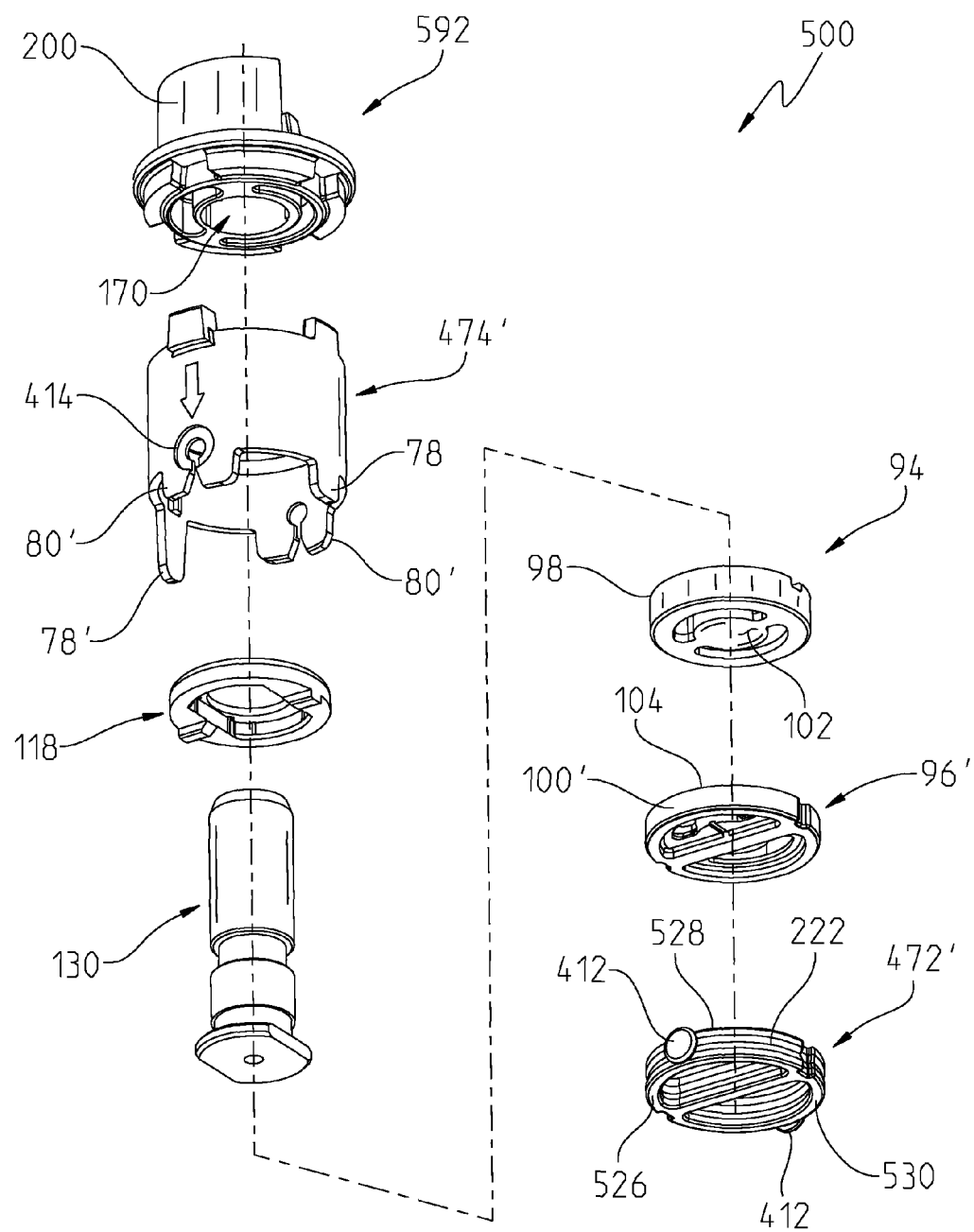
FIG. 29 is a bottom exploded perspective view of the valve cartridge of FIG. 26.

The lower flow control member 96 illustratively includes an annular cleaning recess or channel 186' extending around an upper periphery thereof More particularly, the cleaning channel 186' is defined by a step formed in the upper sealing surface 104 of the lower fluid flow plate 100' and extending around the outer edge 181 thereof (FIG. 28). The cleaning channel 186' is configured to collect debris that may become trapped between the sealing surfaces 102 and 104 of the flow control members 94 and 96', and expel such debris in a generally radially outwardly direction away from the common interface 106 of the flow control members 94 and 96'.

Gasket 472' is substantially similar to gasket 72 as detailed above. The retaining flanges 412 of the gasket 472' substantially comprise disks received within the counterbores 414 of the housing 474'. As shown in FIGS. 31A and 31B, the gasket 472' includes a wall 526 having an undercut center portion 222 connecting an upper portion 528 and a lower portion 530. The center portion 222 has a width less than the upper portion 528 and the lower portion 530 to reduce the axial load on the first and second fluid flow members 94 and 96. More particularly, the reduced cross-section in the center portion 222 reduces the total force applied by the gasket 472' against the flow members 94 and 96. FIG. 31A shows the gasket 472' in a relaxed state, while FIG. 31B shows the gasket 472' when an axial load has been applied, thereby compressing the wall 526. In the compressed state, the gasket 472' is deformed at the center portion 222 to prevent buckling of the gasket 472' in response to axial load on the flow members 94 and 96.

Although the invention has been described in detail with reference to certain preferred embodiments, variations and modifications exist within the spirit and scope of the invention as described and defined in the following claims.

What is claimed is:

1. A valve cartridge for a faucet comprising:
a valve housing;
a first fluid flow member received within the valve housing, the first fluid flow member including a first sealing surface configured to rotate about a longitudinal axis;
a second fluid flow member received within the valve housing and restrained from moving, the second fluid flow member including a second sealing surface, and at least one fluid opening extending into the second sealing surface, the first sealing surface sealingly engaging the second sealing surface to define a common interface including an outer portion having an inner boundary and an outer boundary, the inner boundary defined by the at least one fluid opening;
a stem extending along the longitudinal axis, the stem being operably coupled to the first fluid flow member and configured to rotate the first fluid flow member about the longitudinal axis; and
at least one cleaning channel formed within at least one of the inner and outer boundaries of the common interface and configured to collect debris from between the first fluid flow member and the second fluid flow member and expel the debris radially from the common interface.

2. The valve cartridge of claim 1, wherein:
the first fluid flow member includes an outer surface opposite the first sealing surface, and a blind connecting recess extending inwardly from the first sealing surface and sealed from the outer surface;
the second fluid flow member includes an outer surface opposite the second sealing surface, a first fluid opening extending into the outer surface and the second sealing surface, a second fluid opening extending into the outer surface and the second sealing surface, and a sealing bridge positioned intermediate the first fluid opening and the second fluid opening and defining at least a portion of the second sealing surface; and
rotation of the first fluid flow member about the longitudinal axis changes the position of the connecting recess with respect to the first fluid opening and the second fluid opening of the second fluid flow member, thereby adjusting the flow rate of fluid from the first fluid opening to the second fluid opening.

3. The valve cartridge of claim 1, wherein the stem is operably coupled to the valve housing such that manipulation of the stem controls only the rotation of the first fluid flow member, the first fluid flow member being restrained to sliding movement relative to the second fluid flow member solely about the longitudinal axis.

4. The valve cartridge of claim 1, wherein an outer set of cleaning channels are formed within an outer edge of at least one of the first fluid flow member and the second fluid flow member, and an inner set of cleaning channels are formed within an inner edge of at least one of the first fluid flow member and the second fluid flow member, the outer set of cleaning channels being circumferentially offset from the inner set of cleaning channels.

5. The valve cartridge of claim 4, wherein the cleaning channels are formed within the second sealing surface of the second fluid flow member, the outer set of cleaning channels overlap radially with the inner set of cleaning channels, thereby defining a serpentine path for the second sealing surface.

6. The valve cartridge of claim 1, further comprising a cap including a temperature limit stop, and an engagement member supported for rotation with the stem and configured to selectively engage the limit stop to limit rotation of the stem and the first fluid flow member, the cap being operably coupled to the stem for limited axial and rotational adjustment relative to the valve housing.

7. The valve cartridge of claim 6, wherein rotational adjustment of the cap relative to the valve housing moves the position of the limit stop and the rotational path available to the first fluid flow member, and the housing supports a plurality of indicia providing an indication of the available rotational path.

8. The valve cartridge of claim 1, further comprising a spacer operably coupling the stem to the first fluid flow member, the spacer positioned intermediate the stem and the valve housing to prevent wear to the stem from the housing.

9. The valve cartridge of claim 1, further comprising a base supporting the second fluid flow member, and a gasket positioned intermediate the base and the second fluid flow member to provide a seal between the second fluid flow member and the base, and to provide an axial load for maintaining sealing engagement between the first sealing surface and the second sealing surface.

10. The valve cartridge of claim 9, wherein:
the second fluid flow member includes an outer surface opposite the second sealing surface, a first opening extending into the outer surface and the second sealing surface, a second opening extending into the outer surface and the second sealing surface; and
the base includes a first tubular member telescopingly received within the first opening of the second fluid flow member, and a second tubular member telescopingly received within the second opening of the second fluid flow member.

11. The valve cartridge of claim 9, wherein:
the gasket includes a wall having an upper portion, a lower portion, and a center portion connecting the upper portion and the lower portion; and
the center portion has a width less than the upper portion and the lower portion to reduce the axial load on the first and second fluid flow members.

12. The valve cartridge of claim 11, wherein the gasket is configured to deform at the center portion to prevent buckling of the gasket in response to the axial load on the second fluid flow member.

13. The valve cartridge of claim 1, wherein the at least one cleaning channel comprises an annular step formed within the second fluid flow member and positioned radially outwardly from the outer boundary of the common interface.

14. A valve cartridge for a faucet comprising:
a valve housing defining a longitudinal axis;
a first fluid flow member received within the valve housing, the first fluid flow member including a first sealing surface configured to rotate about the longitudinal axis;
a second fluid flow member received within the valve housing and restrained from moving, the second fluid flow member including a second sealing surface, the first sealing surface sealingly engaging the second sealing surface, the second fluid flow member further including a first opening extending into the second sealing surface, and a second opening extending into the second sealing surface;
a stem extending along the longitudinal axis and operably coupled to the first fluid flow member for rotating the first fluid flow member about the longitudinal axis;

a base supporting the second fluid flow member, the base including a first tubular member telescopingly received within the first opening of the second fluid flow member, and a second tubular member telescopingly received within the second opening of the second fluid flow member; and a gasket positioned intermediate the base and the second fluid flow member to provide a seal between the second fluid flow member and the base, and to provide a force for maintaining sealing engagement between the first sealing surface and the second sealing surface.

15. The valve cartridge of claim 14, further comprising at least one cleaning channel formed within at least one of the first sealing surface of the first fluid flow member and the second sealing surface of the second fluid flow member, the at least one cleaning channel configured to collect debris from between the first fluid flow member and the second fluid flow member.

16. The valve cartridge of claim 14, further comprising a cap including a temperature limit stop, and an engagement member supported by the stem and configured to selectively engage the limit stop to limit rotation of the stem and the first fluid flow member, the cap being operably coupled to the stem for limited axial and rotational adjustment relative to the valve housing.

17. The valve cartridge of claim 16, wherein rotational adjustment of the cap relative to the valve housing moves the position of the limit stop and the rotational path available to the first fluid flow member, and the housing supports a plurality of indicia providing an indication of the rotational path available to the first fluid flow member.

18. The valve cartridge of claim 14, wherein:
the gasket includes a wall having an upper portion, a lower portion, and a center portion connecting the upper portion and the lower portion; and
the center portion has a width less than the upper portion and the lower portion to reduce the force on the first and second fluid flow members.

19. The valve cartridge of claim 18, wherein the gasket is configured to deform at the center portion to prevent buckling of the gasket in response to the force on the second flow member.

20. A valve cartridge for a faucet comprising:
a valve housing;
a fluid flow control member supported within the valve housing;
a stem operably coupled to the fluid flow control member; and
a cap supported by the valve housing, the cap including a bore receiving the stem, a plurality of ribs extending inwardly toward the bore for contacting the stem, and at least one finger biased inwardly toward the bore for pre-loading the stem toward the ribs.

21. The valve cartridge of claim 20, wherein the cap includes a temperature limit stop supporting the ribs.

22. The valve cartridge of claim 21, wherein the cap is supported for rotational adjustment relative to the valve housing.

23. The valve cartridge of claim 21, further comprising an engagement member supported for rotation with the stem and configured to selectively engage the limit stop to limit rotation of the stem and the fluid flow control member.

24. The valve cartridge of claim 21, wherein the temperature limit stop includes an arcuate wall, and the ribs extend radially inward from the arcuate wall toward the bore.

25. The valve cartridge of claim 20, wherein rotational adjustment of the cap relative to the valve housing moves the position of the limit stop and the rotational path available to the fluid flow control member.

26. The valve cartridge of claim 20, wherein the cap is operably coupled to the stem for limited axial and rotational adjustment relative to the stem and the value housing.

27. The valve cartridge of claim 20, wherein the fluid flow control member includes:
a first fluid flow member received within the valve housing, the first fluid flow member including a first sealing surface configured to rotate about a longitudinal axis; and
a second fluid flow member received within the valve housing and restrained from moving, the second fluid flow member including a second sealing surface, the first sealing surface sealingly engaging the second sealing surface.

28. The valve cartridge of claim 20, wherein the at least one finger includes a pair of fingers positioned generally opposite the ribs.

29. The valve cartridge of claim 20, wherein the finger provides a load against the stem such that the stem is supported between multiple contact points defined by the ribs and the finger to inhibit wobble between the stem and the cap.

* * * * *